US009128647B2

(12) United States Patent
Minagawa

(10) Patent No.: US 9,128,647 B2
(45) Date of Patent: Sep. 8, 2015

(54) PRINT RELAY SERVER SYSTEM, METHOD FOR CONTROLLING THE SAME, AND PROGRAM THEREFOR

(75) Inventor: Tomonori Minagawa, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/127,297

(22) PCT Filed: May 31, 2012

(86) PCT No.: PCT/JP2012/003584
§ 371 (c)(1),
(2), (4) Date: Jan. 30, 2014

(87) PCT Pub. No.: WO2013/001718
PCT Pub. Date: Jan. 3, 2013

(65) Prior Publication Data
US 2014/0226179 A1  Aug. 14, 2014

(30) Foreign Application Priority Data

Jun. 29, 2011  (JP) ................................. 2011-144655

(51) Int. Cl.
*G06F 3/12* (2006.01)
*G06K 1/00* (2006.01)
(52) U.S. Cl.
CPC ............ *G06F 3/1206* (2013.01); *G06F 3/1204* (2013.01); *G06F 3/126* (2013.01); *G06F 3/1288* (2013.01)

(58) Field of Classification Search
CPC . G06K 15/4095; G06K 15/02; G06K 15/002; G06F 3/1292; G06F 3/121; G06F 3/1234; G06F 3/1261; G06F 3/1238
USPC .............. 358/1.1, 1.2, 1.4, 1.5, 1.6, 1.9, 1.11, 358/1.12, 1.13, 1.14, 1.15, 1.16, 1.17, 1.18
See application file for complete search history.

(56) References Cited

U.S. PATENT DOCUMENTS

| 7,861,172 | B1 | 12/2010 | Minagawa | |
|---|---|---|---|---|
| 2012/0019855 | A1* | 1/2012 | Takahashi et al. | ........... 358/1.15 |
| 2012/0307293 | A1* | 12/2012 | Natori | ........................ 358/1.15 |
| 2013/0208299 | A1* | 8/2013 | Doui | ........................... 358/1.14 |

FOREIGN PATENT DOCUMENTS

| JP | H7-143264 A | 6/1995 |
|---|---|---|
| JP | H9-258931 A | 10/1997 |
| JP | 2003-196054 A | 7/2003 |
| JP | 2006-56037 A | 3/2006 |

OTHER PUBLICATIONS

U.S. Appl. No. 13/985,822, filed Aug. 15, 2013.

\* cited by examiner

*Primary Examiner* — Thierry L Pham
(74) *Attorney, Agent, or Firm* — Fitzpatrick, Cella, Harper & Scinto

(57) ABSTRACT

A print relay server includes an interface (proxy) for relaying a printing service and an image forming apparatus and for communicating with each printing service on a printing service basis and on a user basis, and registers a virtual printer substituting for the image forming apparatus.

5 Claims, 26 Drawing Sheets

Fig. 11B

```
PRINT RELAY SERVER: USER INFORMATION

LOGIN USER
  User A
                                     1112
USABLE PRINTERS
  Printer-1         [ CHANGE PRINT SETTINGS ]
  Printer-2         [ CHANGE PRINT SETTINGS ]
     )              [   ADD/DELETE PRINTER   ]
   1111                                   )
                                    1115 1113
PRINTING SERVICES TO BE USED
  PRINTING SERVICE G  [ USE THIS PRINTING SERVICE ]
  PRINTING SERVICE H  [ USE THIS PRINTING SERVICE ]
  PRINTING SERVICE A  [ USE THIS PRINTING SERVICE ]
   )                                   ⎯1116
  1114                 [        OK           ]
```

Fig. 11C

```
PRINT SETTINGS
                            ⎯1121
  ONE-/TWO-SIDED    [            ▽ ]
  PRINTING:         [ 1-Side        ]
                    [ 2-Side        ]

⎯1122
  COLOR SETTING:    [            ▽ ]
                    [ mono          ]
                    [ color         ]

⎯1123
  PAGE SIZE:        [            ▽ ]
                    [ B5            ]
                    [ A4            ]
                    [ A3            ]
                            ⎯1124
                    [      OK       ]
```

Fig. 11D

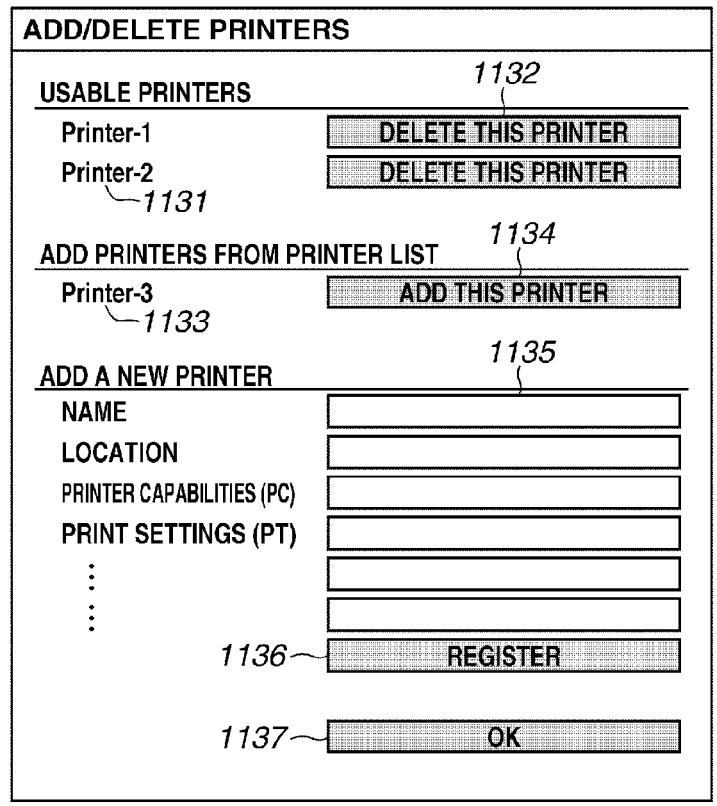

Fig. 12A

| 1201 | 1202 | 1203 | 1204 | 1205 |
|---|---|---|---|---|
| VPID | RPID | PRINTER NAME | CAPABILITIES | PRINTER SETTING INITIAL VALUES |
| VP-BCH-8EA1CB19 | RP-E2B53416 | Printer 1 | PrnCaps-1 | PrnTicket-1 |
| VP-BCH-94E1E881 | RP-E5BF5531 | Printer 2 | PrnCaps-2 | PrnTicket-2 |
| VP-BCH-D24B4912 | RP-677F2761 | Printer 3 | PrnCaps-3 | PrnTicket-3 |

Fig. 12B

| 1211 | 1212 | 1213 |
|---|---|---|
| USER ID OF PRINT RELAY SYSTEM | USABLE VPIDs | PRINT SETTING SPECIFIED VALUES |
| UserA | VP-BCH-8EA1CB19 | PrnTicket-A1 |
| UserA | VP-BCH-94E1E881 | PrnTicket-A2 |
| UserB | VP-BCH-94E1E881 | PrnTicket-B2 |
| UserB | VP-BCH-D24B4912 | PrnTicket-B3 |

Fig. 12C

| 1221 | 1222 | 1223 |
|---|---|---|
| USER ID OF PRINT RELAY SYSTEM | PROXY ID | VPID |
| UserA | Proxy-A | VP-BCH-8EA1CB19 |
| UserA | Proxy-A | VP-BCH-94E1E881 |
| UserB | Proxy-B | VP-BCH-94E1E881 |
| UserB | Proxy-B | VP-BCH-D24B4912 |

Fig. 12D

| 1231 | 1232 | 1233 | 1234 | 1235 |
|---|---|---|---|---|
| SPID | VPID | PRINTER NAME | CAPABILITIES | PRINTER SETTING INITIAL VALUES |
| 58467595613186 | VP-BCH-8EA1CB19 | Printer 1 | PrnCaps-1 | PrnTicket-A1 |
| 89203587436951 | VP-BCH-94E1E881 | Printer 2 | PrnCaps-2 | PrnTicket-A2 |
| 48023610500269 | VP-BCH-94E1E881 | Printer 2 | PrnCaps-2 | PrnTicket-B2 |
| 69985302148027 | VP-BCH-D24B4912 | Printer 3 | PrnCaps-3 | PrnTicket-B3 |

Fig. 12E

| 1241 | 1242 | 1243 | 1244 | 1245 | 1246 |
|---|---|---|---|---|---|
| USER ID OF PRINTING SERVICE | SPID | PRINTER NAME | PROXY ID | CAPABILITIES | PRINTER SETTING INITIAL VALUES |
| UserA@xxx.com | 58467595613186 | Printer 1 | Proxy-A | PrnCaps-1 | PrnTicket-A1 |
| UserA@xxx.com | 89203587436951 | Printer 2 | Proxy-A | PrnCaps-2 | PrnTicket-A2 |
| UserB@xxx.com | 48023610500269 | Printer 2 | Proxy-B | PrnCaps-2 | PrnTicket-B2 |
| UserB@xxx.com | 69985302148027 | Printer 3 | Proxy-B | PrnCaps-3 | PrnTicket-B3 |
| UserB@xxx.com | 87436951480236 | Printer M | Proxy-B | .... | .... |

Fig. 13A

```
<Capabilities>
    <Duplex>
        <Item>1-Side</Item>
        <Item>2-Side</Item>
    </Duplex>
    <Color>
        <Item>mono</Item>
        <Item>color</Item>
    </Color>
    <PaperSize>
        <Item>B5</Item>
        <Item>A4</Item>
        <Item>A3</Item>
    </PaperSize>
</Capabilities>
```

Fig. 13B

```
<PrintSettings>
    <Duplex>
        <Item>1-Side</Item>
    </Duplex>
    <Color>
        <Item>color</Item>
    </Color>
    <PaperSize>
        <Item>A4</Item>
    </PaperSize>
</PrintSettings>
```

Fig. 13C

```
<PrintSettings>
    <Duplex>
        <Item>2-Side</Item>
    </Duplex>
    <Color>
        <Item>mono</Item>
    </Color>
    <PaperSize>
        <Item>A4</Item>
    </PaperSize>
</PrintSettings>
```

Fig. 13D

```
<Register>
    <name>
        <Item>Printer 1</Item>  ~1341
    </name>
    <proxy>
        <Item>Proxy-A</Item>  ~1342
    </proxy>
    <Capabilities>
        <Duplex>
            <Item>1-Side</Item>  ~1343
            <Item>2-Side</Item>
        </Duplex>
        <Color>
            <Item>mono</Item>
            <Item>color</Item>
        </Color>
        <PaperSize>
            <Item>B5</Item>
            <Item>A4</Item>
            <Item>A3</Item>
        </PaperSize>
    </Capabilities>
    <PrintSettings>
        <Duplex>
            <Item>1-Side</Item>  ~1344
        </Duplex>
        <Color>
            <Item>color</Item>
        </Color>
        <PaperSize>
            <Item>A4</Item>
        </PaperSize>
    </PrintSettings>
    .........
</register>
```

Fig. 13E

```
<Printers>
    <id>                    ~1351
        <Item>58467595613186</Item>
    </id>
    <name>
        <Item>Printer 1</Item>
    </name>
    <proxy>
        <Item>Proxy-A</Item>
    </proxy>
</printers>
```

Fig. 13F

```
<PrintJob>
    <printerid>        ⌐1361
        <Item>58467595613186</Item>
    </printerid>
    <id>
        <Item>8023610500269699</Item>
    </id>
    <title>
        <Item>Doc1</Item>
    </title>
    <status>
        <Item>QUEUED</Item>
    </status>
    <dataUrl>          ⌐1362
        <Item>Http://prt.srv.com/
        data/8023610500269699</Item>
    </dataUrl>
    <settingUrl>       ⌐1363
        <Item>http://prt.srv.com/
        setting/8023610500269699</Item>
    </settingUrl>
</PrintJob>
```

Fig. 13G

```
<PrintJob>
    <id>
        <Item>7595613186892035</Item>
    </id>
    <title>
        <Item>Doc1</Item>
    </title>
    <status>
        <Item>QUEUED</Item>
    </status>
    <dataUrl>              ⌐1371
        <Item>http://vprinter.com/VP-BCH-8EA1CB19/
        data/7595613186892035</Item>
    </dataUrl>
    <settingUrl>           ⌐1372
        <Item>http://vprinter.com/VP-BCH-8EA1CB19/
        setting/7595613186892035</Item>
    </settingUrl>
</PrintJob>
```

Fig. 14A

```
Capabilities: [
  {
    "Duplex": "1-Side",
    "Duplex": "2-Side",
    "Color": "mono",
    "Color": "color",
    "PaperSize": "B5",
    "PaperSize": "A4",
    "PaperSize": "A3"
  }
]
```

Fig. 14B

```
PrintSettings: [
  {
    "Duplex": "1-Side",
    "Color": "color",
    "PaperSize": "A4"
  }
]
```

Fig. 14C

```
PrintSettings: [
  {
    "Duplex": "2-Side",
    "Color": "mono",
    "PaperSize": "A4"
  }
]
```

Fig. 14D

```
Register: [
  {
    "name": "Printer 1",
    "proxy": "Proxy-A",
    "capabilities": [
    {
      "Duplex": "1-Side",
      "Duplex": "2-Side",
      "Color": "mono",
      "Color": "color",
      "PaperSize": "B5",
      "PaperSize": "A4",
      "PaperSize": "A3"
    }
    ],
    "defaults": [
    {
      "Duplex": "1-Side",
      "Color": "color",
      "PaperSize": "A4",
    }
    ],
    .........
  }
]
```

Fig. 14E

```
Printers: [
  {
    "id": "58467595613186",
    "name": "Printer 1",
    "proxy": "Proxy-A",
  }
]
```

Fig. 14F

```
PrinterJob: [
 {
   "printerid": "58467595613186",
   "id": "8023610500269699",
   "title": "Doc1",
   "status": "QUEUED",
   "dataUrl": "http://prt.srv.com/data/8023610500269699",
   "settingUrl": "http://prt.srv.com/setting/8023610500269699"
 }
]
```

```
PrinterJob: [
 {
   "id": "7595613186892035",
   "title": "Doc1",
   "status": "QUEUED",
   "dataUrl": "http://vprinter.com/VP-BCH-8EA1CB19/
       data/7595613186892035",
   "settingUrl": "http://vprinter.com/VP-BCH-8EA1CB19/
       setting/7595613186892035"
 }
]
```

Fig. 19A

PRINTING SERVICE-G: USER INFORMATION

LOGIN USER
UserA@xxx.com

REGISTERED PRINTERS
☐ Printer-1
☐ Printer-2 ~1901

DELETE PRINTERS

PRINTERS TO BE REGISTERED
☐ Printer-3
1902

REGISTER PRINTERS

Fig. 19B

PRINT RELAY SERVER: USER INFORMATION

LOGIN USER
UserA

USABLE PRINTERS
Printer-1    CHANGE PRINT SETTINGS
Printer-2    CHANGE PRINT SETTINGS
             ADD/DELETE PRINTER PRINTING SERVICES TO BE USED
☐ PRINTING SERVICE G ~1911
☐ PRINTING SERVICE H
☐ PRINTING SERVICE A    1912

REGISTER TO PRINTING SERVICE

ADD PRINTERS

REGISTER PRINTERS TO THE FOLLOWING PRINTING SERVICES AT THE SAME TIME
- ☐ PRINTING SERVICE G
- ☐ PRINTING SERVICE H ~1921
- ☐ PRINTING SERVICE A

ADD PRINTERS FROM PRINTER LIST
- ☐ Printer-3
- ☐ Printer-4 ~1922

[ ADD PRINTERS ]

ADD A NEW PRINTER    1923

| NAME | |
| LOCATION | |
| PRINTER CAPABILITIES (PC) | |
| PRINT SETTINGS (PT) | |
| ITEM 1 | |
| ITEM 2 | |

[ REGISTER ]

[ OK ]

PRINT RELAY SERVER SYSTEM, METHOD FOR CONTROLLING THE SAME, AND PROGRAM THEREFOR

This application is a national stage application under 35 U.S.C. §371 of International Application No. PCT/JP2012/003584, having an International filing date of May 31, 2012, which claims priority to Japan 2011-144655, filed on Jun. 29, 2011, the contents of each of which are incorporated by reference as if set forth in full herein.

TECHNICAL FIELD

The present invention relates to a print relay server system capable of communicating with a print server system for providing printing services, and communicating with an image forming apparatus, a method for controlling the print relay server system, and a program therefor.

BACKGROUND ART

With a conventional content printing system, a client transmits a print instruction to a server, which, upon reception of the print instruction, converts the content to be printed into print data. The concept of cloud computing has attracted the attention in recent years. Like the above-described content printing system, cloud computing can also be regarded as a form in which a server provides a client with services. Cloud computing is characterized mainly in the capabilities of simultaneously processing requests from many clients by distributedly performing data conversion and data processing by using many computing resources. At present, various vendors are indiscriminately being established, each implementing web services on the cloud computing environment for implementing cloud computing to provide diverse services.

Of these vendors, Google (registered trademark) is noteworthy. Google is aggressively performing various activities including the establishment of a number of large-scale data centers, the proposal of service provision in cooperation with devices, and the development of methods of communication between a device and a service. For example, Google has developed a method of data communication for service provision in cooperation with an image forming apparatus, and disclosed an interface for enabling the image forming apparatus to perform data communication with the cloud computing environment provided by Google. With this interface implemented in an image forming apparatus, a client can specify the image forming apparatus and instruct it to perform printing even if the image forming apparatus is connected with a server via the Internet.

Japanese Patent Application Laid-Open No. 2003-196054 discusses a technique in which a server and an image forming apparatus cooperate with each other. In the technique discussed in Japanese Patent Application Laid-Open No. 2003-196054, a service for generating print data by the server receives a print instruction and printing control information from a client and then generates print data based on the printing control information. This technique enables performing printing suitable for the image forming apparatus without installing a printer driver on the client.

With the technique discussed in Japanese Patent Application Laid-Open No. 2003-196054, however, it is necessary to implement in the image forming apparatus a dedicated interface for communicating with the server. Accordingly, there has been a problem that existing image forming apparatuses, i.e., legacy printers already put on the market, cannot be connected to the server. Although the technique may be used by replacing a board including a communication module, remarkably high work load and cost may result. Further, to utilize a plurality of printing services, it is necessary to implement in each image forming apparatus a communication module conforming to a specification of a vendor providing each individual service, resulting in an increase in complexity and cost. Further, printing services started after sales of an image forming apparatus cannot be easily utilized.

Even if the dedicated interface is implemented, printing cannot be preformed if print data acquired from the server is not in a format that is interpretable by the image forming apparatus (for example, if PDF data is received by an image forming apparatus that is incapable of interpreting PDF).

SUMMARY OF INVENTION

The present invention is directed to a print relay server provided between a print server system for providing printing services and an image forming apparatus for outputting a print job.

According to an aspect of the present invention, a print relay server system capable of communicating with a print server system for generating a print job based on content data specified to be printed via a terminal and for transmitting the generated print job, and communicating with an image forming apparatus for outputting the print job, includes: a proxy provided for each user of the print relay server system and configured to receive the print job from the print server system; a relay virtual printer provided for each image forming apparatus connected to the print relay server system and configured to transmit the received print job to the associated image forming apparatus; acquisition means configured to acquire apparatus information about an image forming apparatus specified for printing the content data and registered in the print server system; and transfer means configured to identify a relay virtual printer based on the acquired apparatus information and to transfer the received print job to the identified relay virtual printer.

According to exemplary embodiments of the present invention, even an image forming apparatus that does not have a communication module conforming to a vendor specification can cooperate with printing services.

Further features and aspects of the present invention will become apparent from the following detailed description of exemplary embodiments with reference to the attached drawings.

BRIEF DESCRIPTION OF DRAWINGS

The accompanying drawings, which are incorporated in and constitute a part of the specification, illustrate exemplary embodiments, features, and aspects of the invention and, together with the description, serve to explain the principles of the invention.

FIG. 11B illustrates a user information UI.

FIG. 11C illustrates a print setting UI.

FIG. 11D illustrates a printer addition/deletion UI.

FIG. 12A illustrates information stored in a printer information storage unit.

FIG. 12B illustrates information stored in a user information storage unit.

FIG. 12C illustrates information stored in another user information storage unit.

FIG. 12D illustrates information stored in another printer information storage unit.

FIG. 12E illustrates information stored in a further printer information storage unit.

FIG. 13A illustrates capabilities represented in the extended markup language (XML) format.

FIG. 13B illustrates print setting initial values represented in the XML format.

FIG. 13C illustrates print settings represented in the XML format.

FIG. 13D illustrates a printer registration request represented in the XML format.

FIG. 13E illustrates a reply to a printer registration request represented in the XML format.

FIG. 13F illustrates notification information A represented in the XML format.

FIG. 13G illustrates notification information B represented in the XML format.

FIG. 14A illustrates capabilities represented in the JavaScript Object Notation (JSON) format.

FIG. 14B illustrates print setting initial values represented in the JSON format.

FIG. 14C illustrates print settings represented in the JSON format.

FIG. 14D illustrates a printer registration request represented in the JSON format.

FIG. 14E illustrates a reply to a printer registration request represented in the JSON format.

FIG. 14F illustrates notification information A represented in the JSON format.

FIG. 19A illustrates a user information UI of the printing service.

FIG. 19B illustrates a user information UI.

FIG. 19C illustrates a printer addition UI.

DESCRIPTION OF EMBODIMENTS

Various exemplary embodiments, features, and aspects of the invention will be described in detail below with reference to the drawings.

Suppose a system in which an image forming apparatus prints content stored on an application server. When printing content of an application server which requires user authentication, the following method is assumed: the image forming apparatus logs into a print server based on user information acquired from a client, acquires print data generated based on the content, and prints the print data.

Once the image forming apparatus logs into the print server, the image forming apparatus retains the connection (session) to enable push printing of print data for the user account of the login user. However, a user having another account cannot perform printing because the image forming apparatus retains a session established by another user. This means that, in this state, push printing cannot be performed by a plurality of users.

A method that the image forming apparatus periodically changes the user account is assumed. With this method, the image forming apparatus needs to retain an ID and a password for each user account and, therefore, a security problem arises. Further, if there are a number of users, it takes time until each user can start printing.

The present invention relates to a print relay server which relays the environment of an interface-providing vendor and a printer. The present invention is directed to providing a system which enables push printing from a plurality of printing services and a plurality of user accounts without unnecessary communication.

Figure 1:
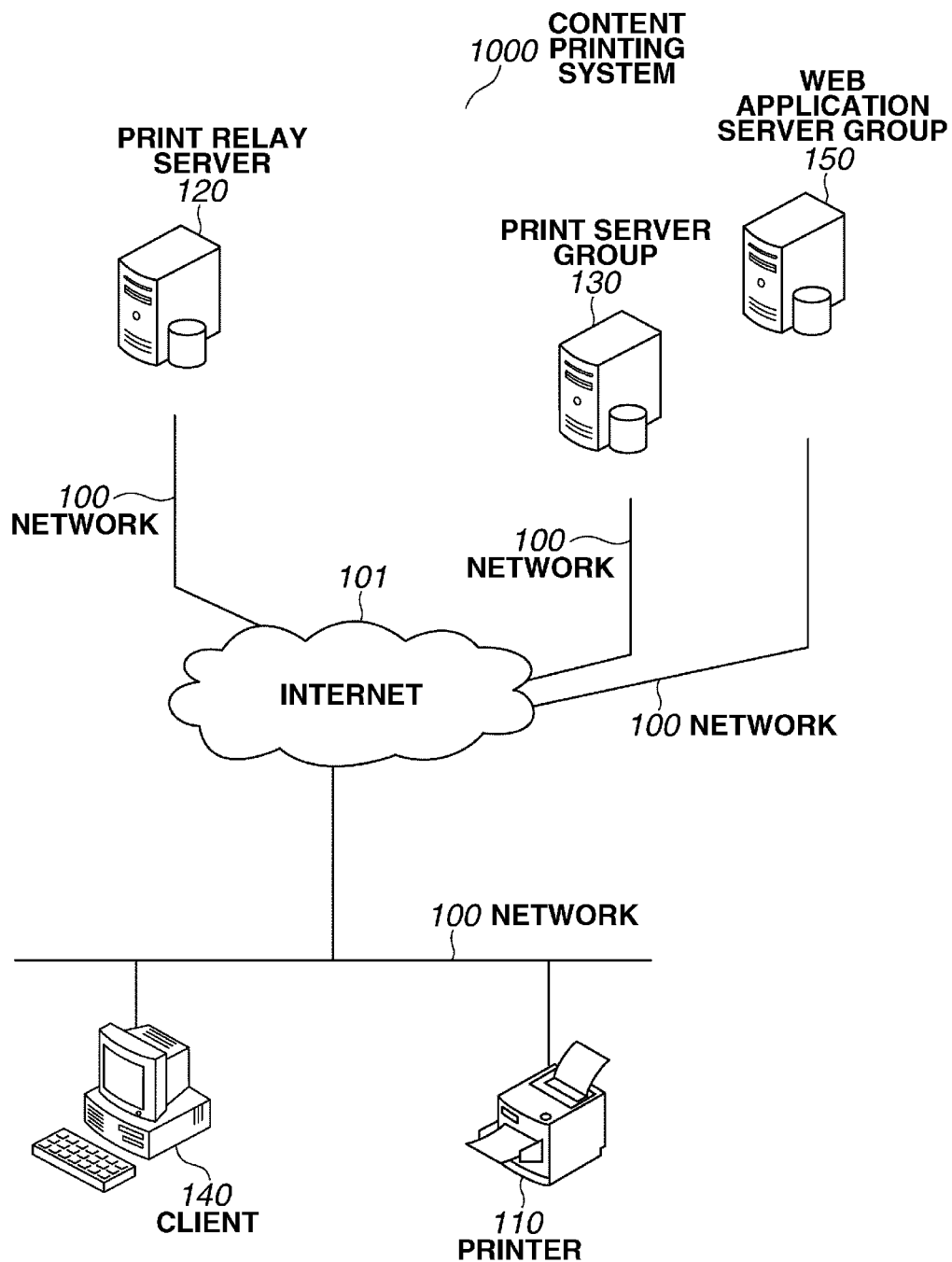
FIG. 1 illustrates an overall configuration of a content printing system according to an exemplary embodiment of the present invention.

First of all, a configuration of a content printing system 1000 according to a first exemplary embodiment will be described below. FIG. 1 illustrates the configuration of the content printing system 1000. The content printing system 1000 includes a client 140 and a printer 110. These two apparatuses are arranged in the user environment and connected with each other via a network 100, which is connected to the Internet 101. The content printing system 1000 further includes a web application server group 150 and a print server group 130. These two server groups may be provided by the same vendor. In this case, both server groups may be connected via the network 100.

The content printing system 1000 further includes a print relay server 120. The print relay server 120 is connected to the network 100, which is connected to the Internet 101. Apparatuses and server groups constituting the content printing system 1000 can be connected with each other via the Internet 101 to enable data communication therebetween. Although the content printing system 1000 includes only one set of each apparatus, it may include a plurality of sets of each apparatus. Although each server group includes a plurality of apparatuses, it may include one apparatus. Therefore, the server apparatus and the server groups illustrated in FIG. 1 will be collectively referred to as a server system. For example, the print server group 130 is equivalent to a print server system, the print relay server 120 is equivalent to a print relay server system, and the web application server group 150 is equivalent to an application server system, and the printer 110 is equivalent to an image forming apparatus.

Figure 2:
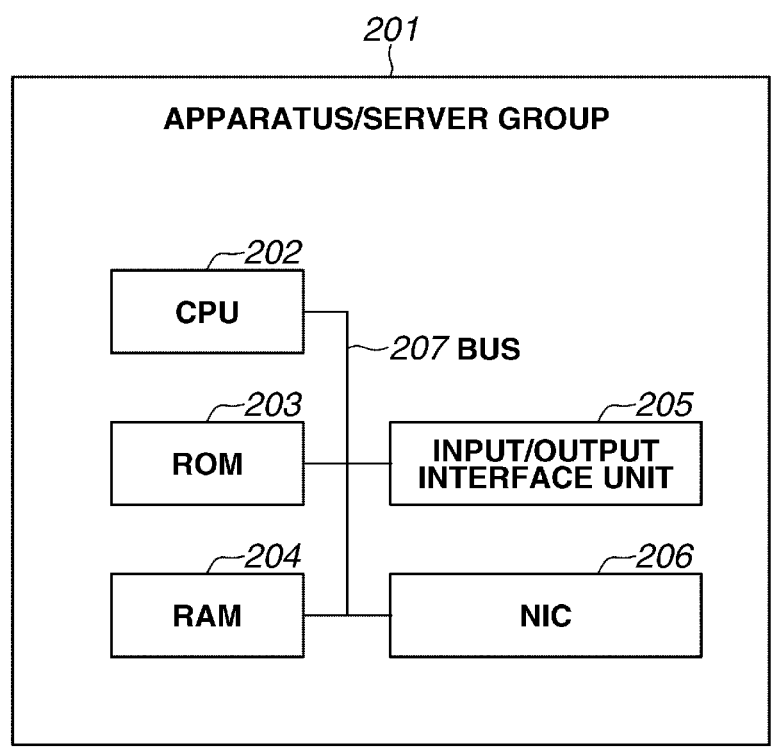
FIG. 2 illustrates a hardware configuration of each apparatus and each server group constituting the content printing system.

A hardware configuration of each apparatus and each server group constituting the content printing system 1000 will be described below. FIG. 2 illustrates the hardware configuration of each apparatus and each server group constituting the content printing system 1000. An apparatus or server group 201 constitutes the content printing system 1000. A central processing unit (CPU) 202 executes various programs to implement various functions. A read only memory (ROM) 203 stores various programs. The CPU 202 loads a program from the ROM 203 into a random access memory (RAM) 204 and then executes it. This program is a program executed by a computer. The RAM 204 also serves as a temporary working storage area for the CPU 202. An input/output interface unit 205 transmits data to a display (not illustrated) connected to each apparatus and each server group, and receives data from a pointing device (not illustrated). A network interface card (NIC) 206 connects to the network 100 each apparatus and each server group constituting the content printing system 1000. The above-described units are capable of transmitting and receiving data via a bus 207. The printer 110 includes a printing unit (not illustrated) capable of transmitting and receiving data to/from each unit via the bus 207. The printing unit can print a raster image on a recording medium.

Figure 3:
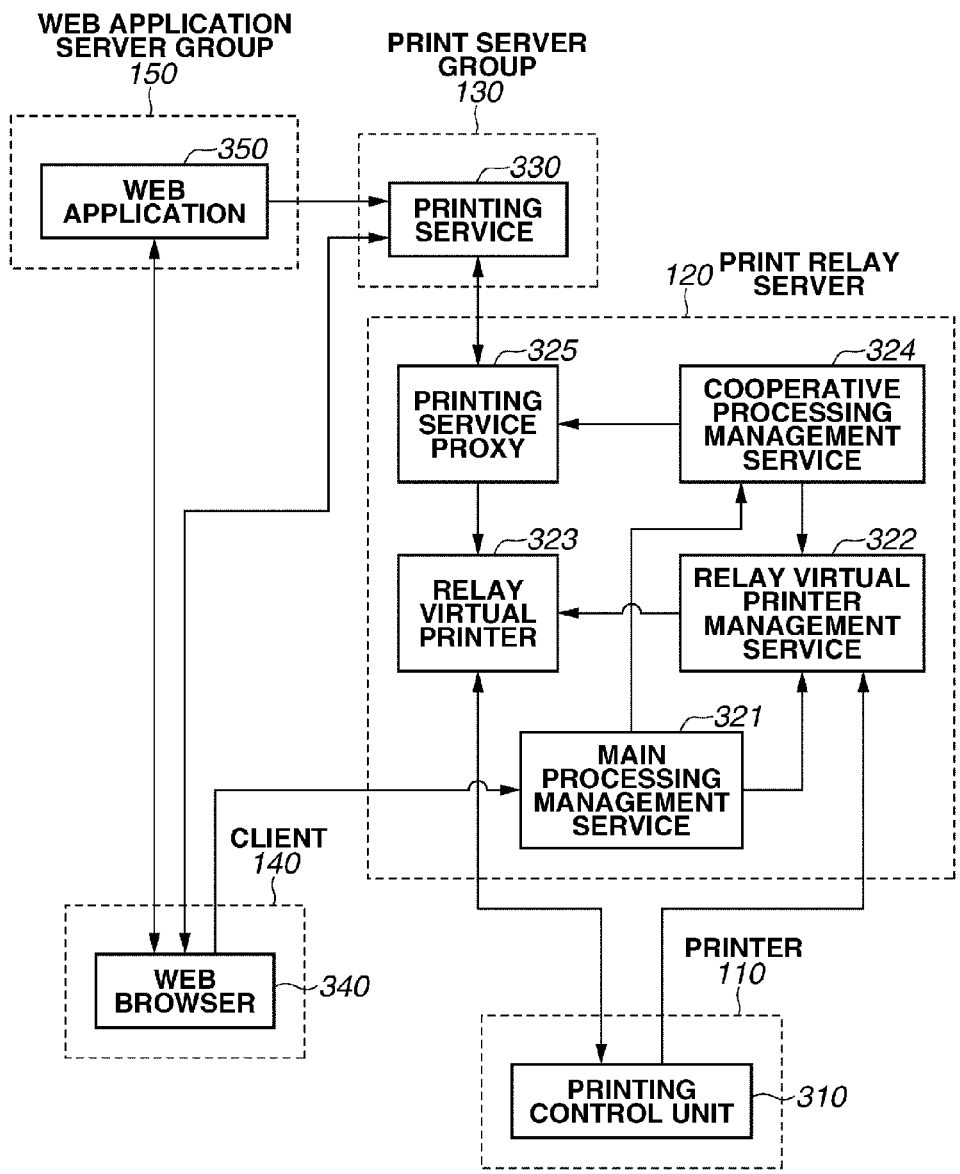
FIG. 3 illustrates a software configuration of each apparatus and each server group constituting the content printing system.

A software configuration of each apparatus and each server constituting the content printing system 1000 will be described below. FIG. 3 illustrates the software configuration of each apparatus and each server group constituting the content printing system 1000. Programs for implementing functions of the software configuration illustrated in FIG. 3 are stored in the ROM 203 of each apparatus and each server group. These functions are implemented when the CPU 202 loads a relevant program from the ROM 203 into the RAM 204 and then executes it.

Functions of each apparatus and each server group will be described below. These functions are classified into the following three categories.

The first category relates to pre-registration processing. Pre-registration functions refer to registering the printer 110 to the print relay server 120 and implementing a relay virtual printer 323 in the print relay server 120.

The second category relates to main registration processing. Main registration functions refer to registering the relay virtual printer 323 (managed by the print relay server 120) to a printing service 330 via a printing service proxy 325.

The third category relates to print processing. Printing functions refer to printing on the printer 110 via the print relay server 120 print data generated by the print server group 130.

The overview of functions of each server system and each device will be described below. The print server group 130 has functions of generating a print job based on content data specified to be printed via the client 140 (terminal) and transmitting the generated print job. The web application server group 150 has functions of providing a screen for generating content in response to a request from the client 140, generating content based on information input via the screen, and storing the generated content. The printer 110 further has a function of outputting the print job. The client 140 receives a service provided by the web application server group 150 and the print server group 130 via an application such as a web browser. The client 140 can further communicate with the print relay server 120 and the printer 110.

Functions in the first category (pre-registration functions) will be described below. Pre-registration functions of the printer 110 will be described below. The printer 110 includes a printing control unit 310 for registering to the print relay server 120 a printer currently being operated by user screen operations.

Figure 4:
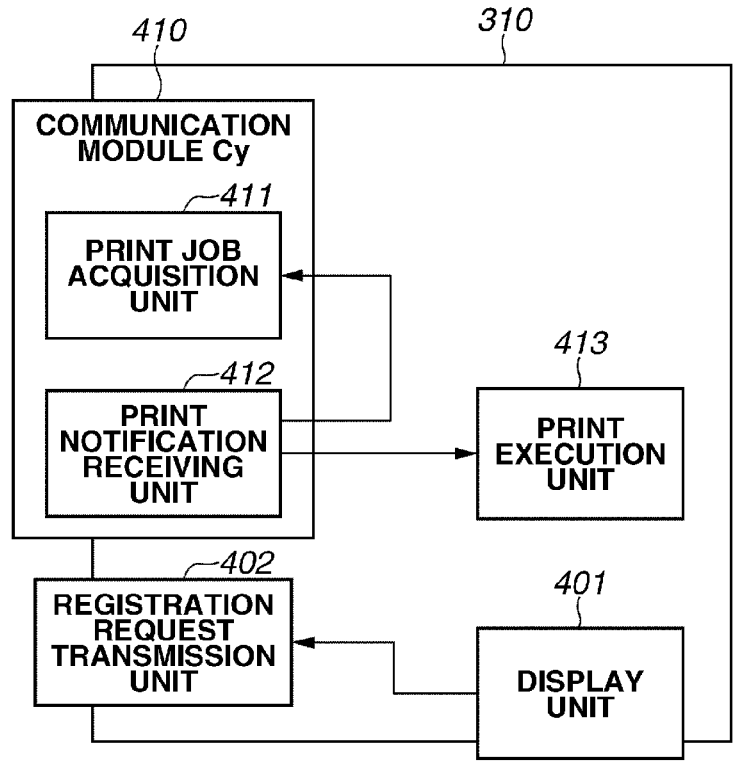
FIG. 4 is a block diagram illustrating a printing control unit.

Functions of the printing control unit 310 will be described below with reference to FIG. 4.

A display unit 401 displays various screens. In this case, the display unit 401 displays a UI illustrated in FIG. 11A. The user can instructs the UI to register the printer 110 to the print relay server 120. A uniform resource locator (URL) and an internet protocol (IP) address of the print relay server 120 may be input via this UI. If a URL and an IP address can be input, printer registration to any print relay server is possible. However, in the first exemplary embodiment, internally recorded values are used as the URL and IP address.

To log into the print relay service 120, the user inputs a user ID 1101 and a password 1102 and then presses a REGISTER button 1103. In this case, the display unit 401 transmits the input information to a registration request transmission unit 402 to request printer registration. The registration request transmission unit 402 logs into the print relay server 120 by using the received input information and, when login is successfully completed, transmits registration information of the present printer to the print relay server 120. The registration instruction may be transmitted not from the printer 110 but from the print relay server 120.

The registration information will be described below. The registration information includes a Real Printer ID (RPID), which is unique identification information assigned to each printer 110. Each printer (not illustrated) including the printer 110 is assigned unique identification information, and identified by the identification information. In the first exemplary embodiment, a printer placement location can be identified by identifying the RPID.

The registration information includes a printer name of each printer 110. The printer name refers to a name assigned to the printer 110, and is used when referring to the printer 110. Unlike the identification information, the printer name may be duplicated for a plurality of printers.

The registration information further includes capabilities. The capabilities refer to such information as whether the printer 110 is capable of two-sided printing, whether it is capable of color printing, its printable paper size, etc. The capabilities can be represented in the XML format, as illustrated in FIG. 13A. <Item> indicates the capabilities of the printer 110, i.e., the printer 110 is capable of two-sided printing and color printing, and printing to paper of the B5, A4, and A3 sizes.

The registration information further includes print setting initial values. As illustrated in FIG. 13B, the print setting initial values can be represented in the XML format, and are a subset of the capabilities illustrated in FIG. 13A. Any <Item> is selected for each function. The example in FIG. 13B indicates that one-sided printing, color printing, and the A4 size are set.

Pre-registration functions of the print relay server 120 will be described below. The print relay server 120 includes a relay virtual printer management service unit 322. When the relay virtual printer management service unit 322 receives a printer registration request, it generates a relay virtual printer 323. The relay virtual printer 323 is provided in each image forming apparatus connected to the print relay server 120, and has a function of transmitting a received print job to an image forming apparatus, i.e., the printer 110.

Figure 5:
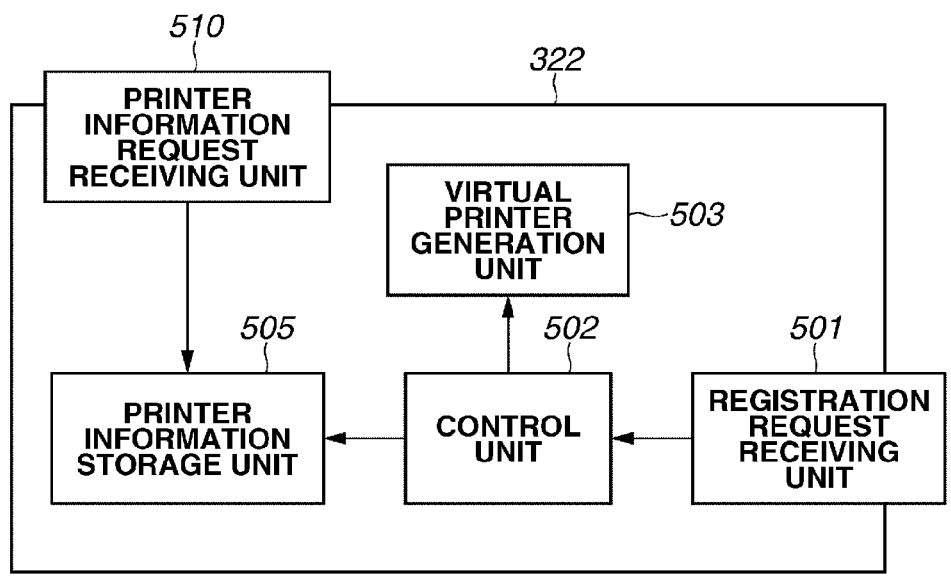
FIG. 5 is a block diagram illustrating a relay virtual printer management service.

Functions of the relay virtual printer management service unit 322 will be described in detail below with reference to FIG. 5.

A registration request receiving unit 501 receives registration information transmitted from the printer registration request transmission unit 402. A control unit 502 acquires the registration information received by the printer registration request receiving unit 501 and then interprets the registration information. The control unit 502 instructs a virtual printer generation unit 503 to generate a relay virtual printer 323.

The virtual printer generation unit 503 includes a communication module Cx 610 conforming to a method of communication with a target printer. The communication module Cx 610, an interface for communicating with the printer 110, is capable of communicating with a communication module Cy 410 of the above-described printer 110.

The virtual printer generation unit 503 implements a process (thread) which loaded the communication module Cx 610. This process is equivalent to the relay virtual printer 323 for implementing each function illustrated in FIG. 6. In addition to the communication module Cx 610, the relay virtual printer 323 has functions of receiving a print notification, acquiring a print job including print data and print settings, and generating a new print job from the print job. Each function will be described in detail below.

When the virtual printer generation unit 503 implements the relay virtual printer 323, the virtual printer generation unit 503 issues to the control unit 502 a Virtual Printer ID (VPID), which is identification information for identifying the implemented relay virtual printer 323. The relay virtual printer 323 is a virtual printer implemented each time registration information is transferred from the printer 110. Each implemented relay virtual printer 323 is assigned a VPID, which is a unique identifier. In the first exemplary embodiment, it becomes possible to identify a relay virtual printer 323 by identifying the VPID.

After acquiring the VPID from the virtual printer generation unit 503, the control unit 502 instructs a printer information storage unit 505 to store the VPID and registration information. The printer information storage unit 505 stores the VPID and registration information in an associated way, as illustrated in FIG. 12A. The registration information stored in the printer information storage unit 505 includes VPIDs 1201, RPIDs 1202, printer names 1203, capabilities 1204, and print setting specified values 1205.

The virtual printer 323 may not be an individual process but a structure subjected to logically distinguished processing within a single process. Specifically, it is preferable that the virtual printer 323 is a structure in which identifying the VPID enables controlling the corresponding RPID.

This completes descriptions of the pre-registration functions of registering the printer 110 to the print relay server 120 and implementing the relay virtual printer 323 in the print relay server 120.

Functions in the second category (main registration functions) will be described below. Main registration functions of the print relay server 120 will be described below. The print relay server 120 includes a main processing management service unit 321. The main processing management service unit 321 is a common processing unit independent of the printing service 330. In this case, the main processing management service unit 321 performs preprocessing for registering the relay virtual printer 323 to the printing service 330 according to a user instruction.

Figure 7:
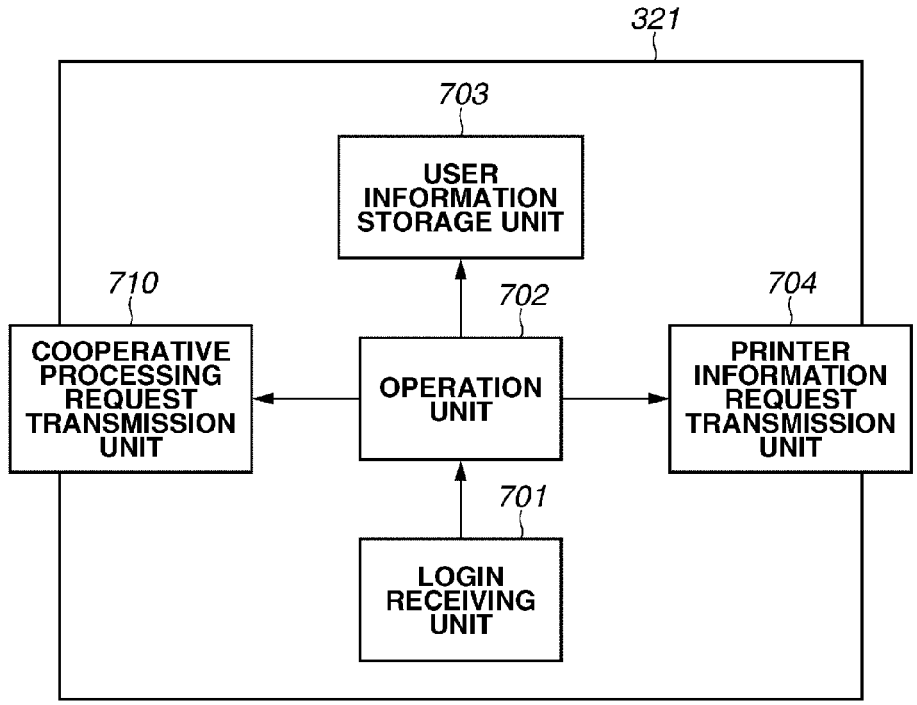
FIG. 7 is a block diagram illustrating a main processing management service.

Functions of the main processing management service unit 321 will be described below with reference to FIG. 7.

A login receiving unit 701 receives a login performed by the client 140 via a web browser 340. Upon completion of user authentication, the login receiving unit 701 performs processing according to the user account of the login user.

The operation unit 702 displays a screen for accepting user operations, as illustrated in FIG. 11B. This screen is also generated based on information set for each user. The screen illustrated in FIG. 11B includes a printer list 1111 of printers usable by the user, CHANGE PRINT SETTINGS buttons 1112 for respective printers, an ADD/DELETE PRINTER button 1113 for managing printers usable by the user, a printing service vendor list 1114, and USE THIS PRINTING SERVICE buttons 1115 for cooperating with respective printing services.

When the user presses the ADD/DELETE PRINTER button 1113, an ADD/DELETE PRINTERS screen illustrated in FIG. 11D is displayed. In this case, this screen displays a printer list 1131 of printers usable by the user, and DELETE THIS PRINTER buttons 1132 for deleting respective printers, a printer list 1133 of printers usable by the print relay server 120 and can be requested to be used by the user, ADD THIS PRINTER buttons 1134 for adding respective printers, information input fields 1135 for inputting information about a new printer to be registered to the print relay server 120, and a REGISTER button 1136 for registering the new printer. The information input fields 1135 and the REGISTER button 1136 are used to perform on the operation screen of the server 120 processing equivalent to the above-described processing performed by the printer registration request transmission unit 402 of the printer 110.

When printers usable by the user have been determined, the operation unit 702 instructs the user information storage unit 703 to store the user ID, the VPID for identifying a usable printer, and print settings in an associated way, as illustrated in FIG. 12B. The stored information includes user IDs 1211, VPIDs 1212, and print setting specified values 1213 for each VPID. When the user adds or deletes a printer, the number of printers 1212 associated with the user ID 1211 changes. The print setting specified values 1213 are specified values used when selecting a printer and performing print setting from an application.

Initial values of the print setting specified values 1213 are the print setting initial values 1205 stored in the table illustrated in FIG. 12A. This information is acquired as follows. First of all, the operation unit 702 instructs the printer information request transmission unit 704 to request the relay virtual printer management service 322 for printer information. In this case, the operation unit 702 transfers to the printer information request transmission unit 704 the VPID of the printer subjected to information request. The relay virtual printer management service 322 receives the request via the printer information request receiving unit 510. Via the printer information storage unit 505, the printer information request receiving unit 510 acquires information (FIG. 12A) associated with a received VPID, specifically, the print setting initial values 1205. The printer information request receiving unit 510 returns the acquired information to the printer information request transmission unit 704. The printer information request transmission unit 704 returns the acquired information to the operation unit 702. Thus, the operation unit 702 acquires the print setting initial values 1205.

When the user presses an OK button 1137 in the screen illustrated in FIG. 11D, the usable printers are applied and the screen illustrated in FIG. 11B appears. In this screen, display of usable printers is refreshed. Usable printers can be managed on a user basis in this way.

When the user presses a CHANGE PRINT SETTINGS button 1112 in the UI illustrated in FIG. 11B, the operation unit 702 instructs the printer information request transmission unit 704 to request the relay virtual printer management service 322 for printer information. In this case, the operation unit 702 transfers to the printer information request transmission unit 704 the VPID of the printer subjected to information request. The relay virtual printer management service 322 receives the request via the printer information request receiving unit 510. Via the printer information storage unit 505, the printer information request receiving unit 510 acquires information (FIG. 12A) associated with a received VPID, specifically, the capabilities 1204. The printer information request receiving unit 510 returns the acquired information to the printer information request transmission unit 704. The printer information request transmission unit 704 returns the acquired information to the operation unit 702. The operation unit 702 further transfers to the user information storage unit 703 the VPID of the printer subjected to information request, to request information about the printer. In this case, via the user information storage unit 703, the operation unit 702 acquires the print setting specified values 1213 managed by the table illustrated in FIG. 12B. Thus, the operation unit 702 acquires the capabilities and print settings of the selected printer.

Then, the operation unit 702 displays a print setting screen illustrated in FIG. 11C. Setting items and options are generated based on the acquired capabilities. Further, the acquired print setting specified values 1213 are applied to the initial settings.

When the user changes a print setting via the UI screen, the setting value is stored in the XML format, as illustrated in FIG. 13C. The example illustrated in FIG. 13C indicates that two-sided printing, monochrome printing, and the A4 size are set. When the user presses the OK button 1124, the settings are applied and the operation unit 702 transmits to the user information storage unit 703 the print settings in the XML format and the VPID of the relevant printer. The user information storage unit 703 updates the print setting specified values 1213 of the relevant printer of the relevant user with the received settings.

Since print settings for respective printers are managed on a user basis in this way, one printer can have different specified values for respective users.

When the user presses the USE THIS PRINTING SERVICE button 1115 in the UI illustrated in FIG. 11B, the operation unit 702 instructs the cooperative processing request transmission unit 710 for cooperative processing. The cooperative processing request transmission unit 710 transmits a cooperative processing request to the cooperative processing management service 324 corresponding to the selected printing service. In this case, the cooperative processing request transmission unit 710 transmits the user ID, a VPID list corresponding to usable printers, and information associated with each VPID. The required information associated with the VPID includes the printer name 1203 and the capabilities 1204 managed by the printer information storage unit 505, and the print setting specified values 1213 managed by the user information storage unit 703.

Main registration functions of the cooperative processing management service 324 of the print relay server 120 will be described below. One cooperative processing management service 324 exists in each print server system. The cooperative processing management service 324 generates a process conforming to a communication specification for receiving a print job disclosed by a vendor providing each print server system. This process is provided with an interface conforming to the communication specification to enable communicating with the print server system. In the present exemplary embodiment, a printing service proxy 325 is generated. A printing service proxy 325 is provided for each user of the print relay server 120, and has a function of receiving a print job from each print server system. The cooperative processing management service 324 manages information required for performing communication and printing.

Figure 8:
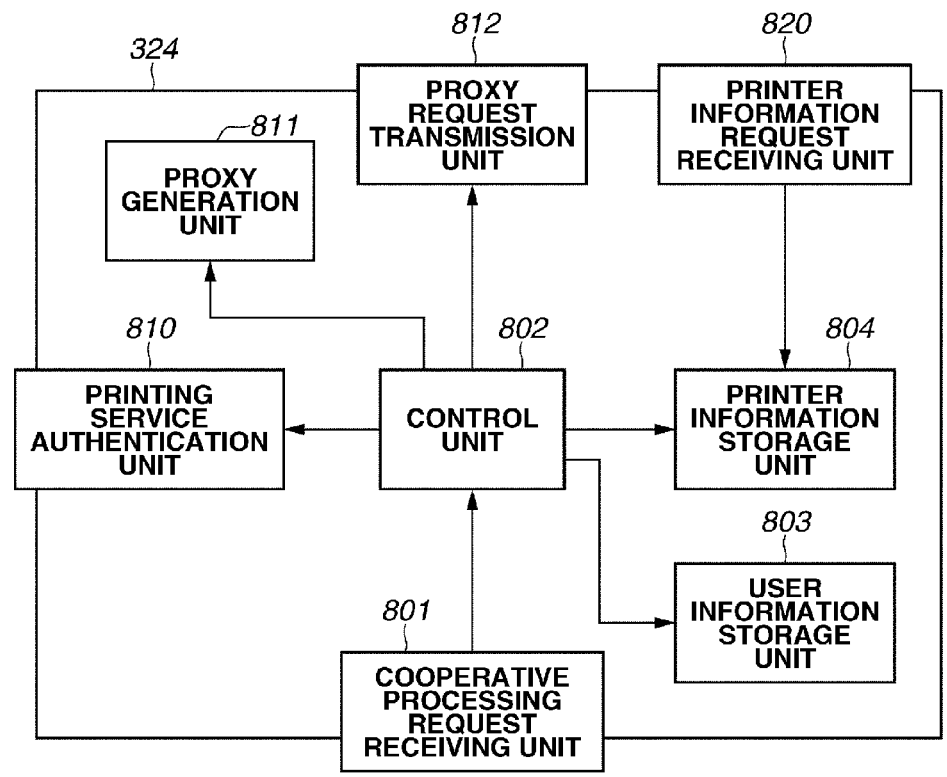
FIG. 8 is a block diagram illustrating a cooperative processing management service.

Functions of the cooperative processing management service 324 will be described below with reference to FIG. 8.

The cooperative processing request receiving unit 801 receives from the cooperative processing request transmission unit 710 a request and necessary information such as printer name, capabilities, and print settings. The cooperative processing request receiving unit 801 transmits the received information to the control unit 802. The control unit 802 interprets the received information and then instructs the user information storage unit 803 to check whether a relevant user ID exists in the information managed thereby. The information managed by the user information storage unit 803 will be described in detail below.

If the relevant user ID does not exist, it means that the user uses this printing service for the first time. Therefore, the control unit 802 performs user authentication for the target print server group. In this case, the control unit 802 instructs the printing service authentication unit 810 to log into the print server group 130. In this case, the user inputs in the login screen displayed by the printing service 330 a user account (an ID and a password) for accessing the printing service. When user authentication is successfully completed, the printing service authentication unit 810 receives an authentication token from the print server group 130 and then transfers it to the control unit 802. If user authentication fails, it means that the user cannot use the printing service. Therefore, the cooperative processing request receiving unit 801 returns a status of failure to the cooperative processing request transmission unit 710.

Then, the control unit 802 instructs the proxy generation unit 811 to implement the functions of the printing service proxy 325. The printing service proxy 325 implements the functions illustrated in FIG. 9. The proxy generation unit 811 includes a communication module Ay 910 conforming to the method of communication with the target printing service. The communication module Ay 910, an interface for communicating with the print server group 130, is capable of communicating with the communication module Ax 1010 of the printing service 330 (described below). The proxy generation unit 811 implements a process (thread) which loaded the communication module Ax. This process is equivalent to the printing service proxy 325. In addition to the communication module Ax 1010, the printing service proxy 325 has functions of registering a printer to the printing service 330 and transferring print data and print settings (acquired from the printing service 330) to another module. Functions of the printing service proxy 325 will be described in detail below.

When the proxy generation unit 811 implements the printing service proxy 325, the proxy generation unit 811 issues to the control unit 802 a proxy ID, which is identification information for identifying the implemented printing service proxy 325. The printing service proxy 325 is implemented for each user ID. A proxy ID, which is unique identification information, is assigned to each implemented printing service proxy 325. In the present exemplary embodiment, a printing service proxy 325 can be identified based on the proxy ID.

The proxy ID may be issued by the printing service 330. In this case, the control unit 802 manages the proxy ID received from the printing service 330.

After the printing service proxy 325 is generated, the control unit 802 instructs the proxy request transmission unit 812 for printer registration. The proxy request transmission unit 812 requests the printing service proxy 325 to register a printer to the printing service 330. In this case, the proxy request transmission unit 812 transmits to the printing service proxy 325 a user authentication token, the proxy ID, the VPID list, and other related information. As described below, after printer registration processing, the printing service proxy 325 returns a Service Printer ID (SPID) list corresponding to each VPID. The SPID equivalent to apparatus information will be described in detail below. Upon reception of an SPID list, the proxy request transmission unit 812 returns the SPID list to the control unit 802.

As described above, when the proxy generation unit 811 and the proxy request transmission unit 812 have completed processing, the control unit 802 acquires the proxy ID of the generated printing service proxy 325 and the SPID list corresponding to the VPID registered in the printing service 330. The control unit 802 instructs the user information storage unit 803 to store the user ID, the proxy ID to the printing service 330, and other related information managed by the print relay server 120 in an associated way, as illustrated in FIG. 12C. The user information includes user IDs 1221, proxy IDs 1222, and VPID lists 1223 of VPIDs usable by the present user. The control unit 802 further instructs the printer information storage unit 804 to store the SPID, the VPID, and other related information in an associated way, as illustrated in FIG. 12D. The printer information includes SPIDs 1231, VPIDs 1232, printer names 1233, capabilities 1234, and print setting specified values 1235. Thus, the apparatus information transmitted at the time of registration, i.e., the SPID is associated with the registered relay virtual printer, i.e., the VPID.

When the user who has already generated a printing service proxy 325 uses the cooperative processing management service 324 again, the above-described processing of the proxy generation unit 811 is skipped. In this case, the control unit 802 confirms through comparison whether there is a difference between the VPID list received from the cooperative processing request receiving unit 801 and the VPID list associated with the user stored in the user information storage unit 803. When there is a difference, it means that the printers registered in the printing service 330 do not coincide with the printers usable by the user. In this case, the control unit 802 confirms a VPID which should be added and a VPID which should be deleted and then instructs the proxy request transmission unit 812 to add and delete printers.

Main registration functions of the printing service proxy 325 of the print relay server 120 will be described below. The printing service proxy 325 is a process having a communication interface conforming to the method of communication with the printing service 330. The cooperative processing management service 324 existing in each printing service generates a printing service proxy 325 for each user account for each printing service. When each generated printing service proxy 325 is individually connected with the printing service 330, all users are simultaneously connected to all printing services. In this case, the printing service proxy 325 performs processing for registering a printer to the printing service 330.

Figure 9:
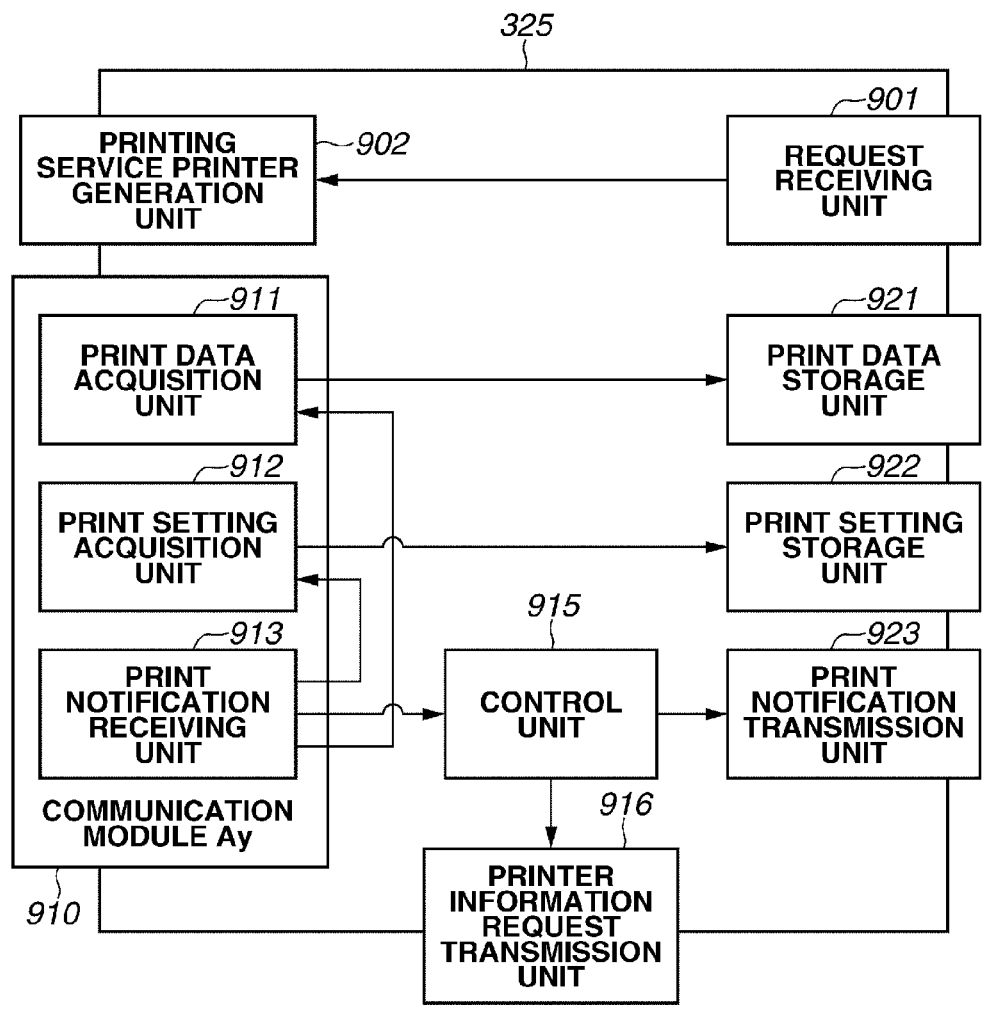
FIG. 9 is a block diagram illustrating a printing service proxy.

Functions of the printing service proxy 325 will be described below with reference to FIG. 9.

The request receiving unit 901 receives from the proxy request transmission unit 812 a printer registration request, a user authentication token, a proxy ID, a VPID list, and other related information. The request receiving unit 901 instructs the printing service printer generation unit 902 to perform printer registration processing. The printing service printer generation unit 902 connects to the printing service 330 by using the received authentication token, and subsequently maintains the connection. Then, based on the received information, the printing service printer generation unit 902 requests the printing service 330 to register a printer. FIG. 13D illustrates example print request information to be transferred to the printing service 330. The print request information described in the XML format includes a printer name 1341, a proxy ID 1342, capabilities 1343, and print settings 1344. Although information for one printer is described in this case, information for a plurality of printers can be described to collectively register them with one request.

As a response to the printer registration request, the printing service printer generation unit 902 receives from the printing service 330 an SPID equivalent to apparatus information. FIG. 13E illustrates example information described in the XML format. An SPID 1351 corresponding to each printer is assigned. Although information for one printer is described in this case, information for a plurality of printers can be collectively returned with one response. The printing service printer generation unit 902 returns the received SPID to the request receiving unit 901. The request receiving unit 901 returns the same information to the proxy request transmission unit 812.

There has been a problem that allowing a print relay service 120 to hold the user account information (a user ID and a password) for connecting with each printing service is not desirable from the viewpoint of security. However, as described above, after logging into a printing service, the printing service printer generation unit 902 maintains the connection by using an authentication token. This eliminates the need for holding the user account information of the printing service on the printing relay server 120, reducing security risk.

Main registration functions of the print server group 130 will be described below. The print server group 130 includes a plurality of printing services 330. The print server group 130 includes a plurality of servers virtually recognized as one server which implements the functions of the printing services 330. In the print server group 130, the one server includes a plurality of virtual machines which are activated to implement the functions of respective printing services 330. The printing service 330 illustrated in FIG. 3 represents one of these virtual machines.

The printing service 330 receives a printer registration request and then generates a service printer selectable from an application. Functions of the printing service 330 will be described below with reference to FIG. 10.

A printer information registration unit 1001 receives a printer registration request and related information from the printing service printer generation unit 902. Based on the received information, the printer information registration unit 1001 generates a service printer corresponding to each printer requested to be registered and then issues an SPID for each service printer.

The SPID will be described below. Upon reception of the printer registration request, the printing service 330 issues an SPID, which is identification information for identifying the printer to be registered. When a printer of the printing service 330 is selected at the time of printing, the printing service 330 identifies the selected printer by using the SPID corresponding to the printer.

The SPID issued by the printing service 330 is transmitted to the printer information storage unit 1002 and the printing service printer generation unit 902.

The printer information storage unit 1002 stores the user ID, the SPID, the printer name, the proxy ID, capabilities, and print settings in the printing service 330 in an associated way. FIG. 12E illustrates information stored in the printer information storage unit 1002. This information includes user IDs 1241, SPIDs 1242, printer names 1243, proxy IDs 1244, capabilities 1245, and print settings 1246.

When printer registration is performed from an interface having different proxy IDs like the information managed by UserB@xxx.com illustrated in FIG. 12E, relevant information is managed so that it is easy to determine which printer was registered from which proxy. The proxy ID 1244 is unique information for identifying a proxy provided for each user of the print relay server 120. Therefore, one of proxies in the print relay server 120 is registered in association with one user who specifies printing.

This completes descriptions of the main registration functions for registering a relay virtual printer 323 (managed by the print relay server 120) to the printing service 330 via the printing service proxy 325.

Printing functions will be described below. First of all, functions of the client 140 will be described below. The client 140 includes the web browser 340.

The web browser 340 transmits to the web application server group 150 an instruction for instructing the web application server group 150 to print content stored therein. The web browser 340 receives from the web application server group 150 an instruction for accessing the print server group 130, i.e., a redirection instruction, and then accesses the print server group 130 according to the received redirection instruction. The web browser 340 acquires from the accessed print server group 130 a printer list of printers usable by the user of the web browser 340 and then displays the printer list. The web browser 340 further acquires from the print server group 130 a print setting screen corresponding to a printer selected from the printer list by the user and then displays the print setting screen. FIG. 11C illustrates an example print setting screen corresponding to a printer selected by the user, displayed by the web browser 340. The web browser 340 transmits to the print server group 130 print setting values set in the print setting screen by the user.

This completes descriptions of the functions of the web browser 340 of the client 140.

Functions of the web application server group 150 will be described below. The web application server group 150 includes a plurality of web applications 350. The web application server group 150 includes a plurality of servers virtually recognized as one server which implements the functions of the web applications 350. In the web application server group 150, the one server includes a plurality of virtual machines which are activated to implement the functions of respective web applications 350.

The web application 350 provides a document generation service. For example, the user uses the document generation service to prepare a document to be distributed in a company meeting. When the client 140 uses the web application 350, it is not necessary to install the web application 350 on the client 140. The client 140 needs only to have the web browser 340. The web application 350 transmits to the web browser 340 screen information for preparing the document. Based on the user information including a user ID and a password input via the web browser 340 by the user, the web application 350 performs user authentication and then transmits screen information for preparing a document in response to the success of user authentication. Upon reception of the screen information, the web browser 340 displays a screen for generating a document (hereinafter referred to as document generation screen). The user prepares by using the document generation screen a document to be distributed in a company meeting. The web application 350 receives information about the document prepared in the document generation screen by the user, generates content based on the received document information, and stores the generated content in a storage unit of the web application server group 150. The web application 350 provides not only the document generation service but also the mail service and schedule service.

Figures 14G, 15:
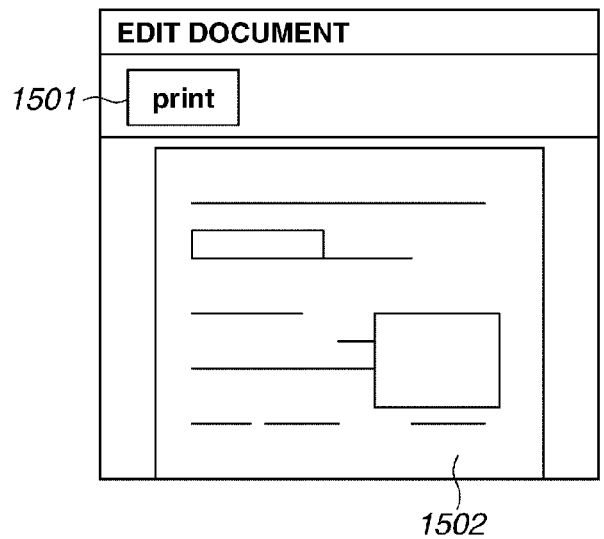
FIG. 14G illustrates notification information B represented in the JSON format.
FIG. 15 illustrates that a print button is pressed.

If the user wants to print content generated by using the document generation service, the user presses the PRINT button displayed on the document generation screen. FIG. 15 illustrates that the PRINT button 1501 is pressed and content 1502 is generated by the user. The web application 350 receives information notifying that the PRINT button 1501 is pressed, and transmits to the web browser 340 an instruction for accessing the print server group 130, i.e., a redirection instruction. The redirection instruction includes a request to acquire a printer list corresponding to the user using the web browser 340, content identification information for identifying content specified to be printed by the user, and user information. Upon reception of a content acquisition request from the print server group 130, the web application 350 transmits the target content to the print server group 130 based on the content identification information for identifying the content transferred together with the content acquisition request.

This completes descriptions of the functions of the web application 350 of the web application server group 150.

Printing functions of the print server group 130 will be described below. The print server group 130 includes the printing service 330. The printing service 330 acquires print data from the web application 350 and then transmits the print data to a printer or a module having a printer-based interface to accomplish printing.

Figures 10, 11A:
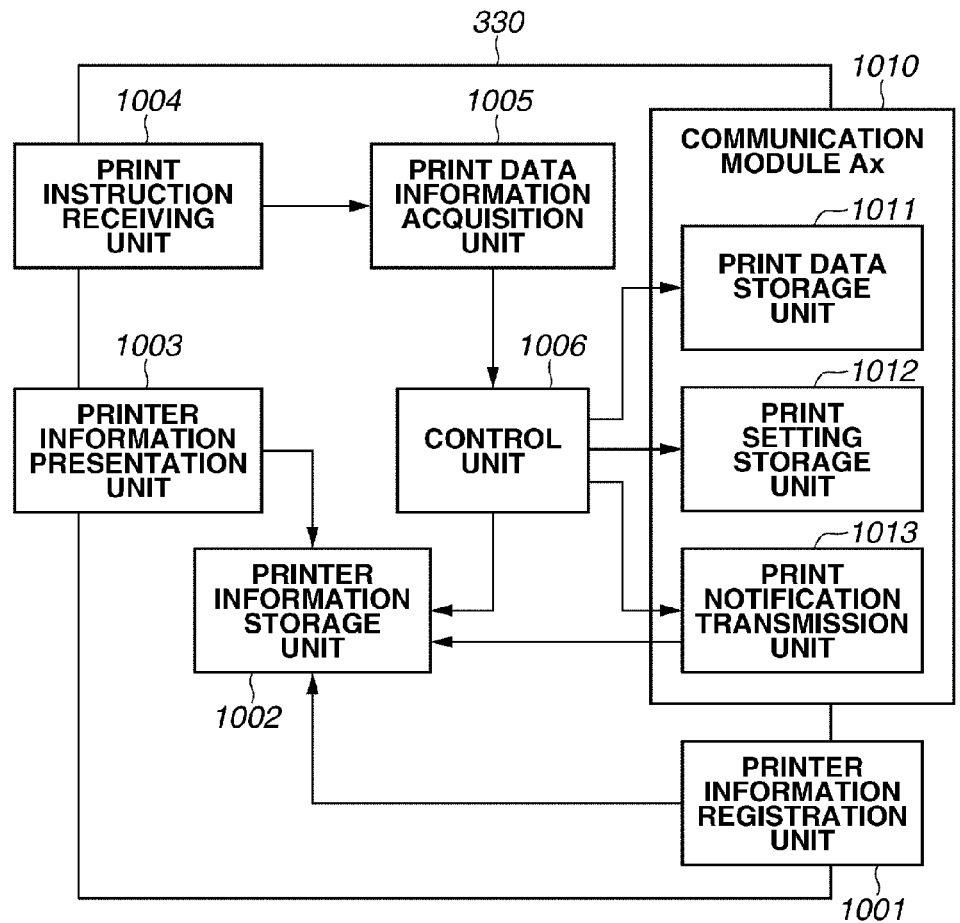
FIG. 10 is a block diagram illustrating a printing service.
FIG. 11A illustrates a printer registration user interface (UI).

Functions of the printing service 330 will be described below with reference to FIG. 10.

The printing service 330 includes a printer information presentation unit 1003. Upon reception of a printer list acquisition request from the web browser 340, the printer information presentation unit 1003 transmits a printer list to the web browser 340. Based on user information, the printer information presentation unit 1003 identifies an SPID and printer name stored in the printer information storage unit 1002. Based on the SPID and printer name, the printer information presentation unit 1003 generates a printer list of printers usable by the user. The printer information presentation unit 1003 further receives an SPID of a printer selected from the printer list by the user. The printer information presentation unit 1003 identifies capabilities stored in the printer information storage unit 1002 based on the received SPID, generates a print setting screen, and transmits the generated print setting screen to the web browser 340. Based on the received SPID, the printer information presentation unit 1003 further identifies print setting specified values stored in the printer information storage unit 1002 and then considers them as initial setting values.

Based on information about the capabilities illustrated in FIG. 12E, the printer information storage unit 1002 generates a print setting screen illustrated in FIG. 11C. As illustrated in FIG. 11C, the printer information storage unit 1002 generates a print setting screen which allows the user to select only print settings described in the capabilities.

A print instruction receiving unit 1004 receives from the web browser 340 print settings set via the print setting screen, and the SPID. When the web browser 340 accesses the print instruction receiving unit 1004 based on the redirection instruction, the print instruction receiving unit 1004 further receives content identification information for identifying the content specified to be printed by the user.

The print data information acquisition unit 1005 receives the content identification information from the print instruction receiving unit 1004 and, based on the received content identification information, acquires from the web application 350 the content to be printed. The print data information acquisition unit 1005 further receives from the print instruction receiving unit 1004 print settings input by the user, and an SPID corresponding to the printer selected by the user. Based on the content and print settings acquired from the web application 350, the print data information acquisition unit 1005 may convert the content into print data as required.

The control unit 1006 acquires the print data, print settings, and an SPID from the print data information acquisition unit 1005. The print settings are described in the XML format, as illustrated in FIG. 13C. The print settings illustrated in FIG. 13C indicate that the user has set two-sided printing, monochrome printing, and A4 paper size.

The communication module Ax 1010, an interface of data communication between two apparatuses, is capable of communicating with an apparatus having the communication module Ay 910. The communication module Ax 1010 includes a print data storage unit 1011, a print setting storage unit 1012, and a print notification transmission unit 1013. The print data storage unit 1011 receives the print data from the control unit 1006 and then stores it. The print setting storage unit 1012 receives the print settings from the control unit 1006 and then stores them. Upon reception of notifications of the completion of data storage from the print data storage unit 1011 and the print setting storage unit 1012, the control unit 1006 instructs the print notification transmission unit 1013 to transfer notification information.

Upon reception of the instruction for transferring the notification information from the control unit 1006, the print notification transmission unit 1013 acquires a print data storage location and a print setting storage location from the control unit 1006 and then generates notification information A. The notification information A, described in the XML format as illustrated in FIG. 13F, includes an SPID 1361, a print data storage location 1362, and a print setting storage location 1363. The print notification transmission unit 1013 further acquires an SPID from the control unit 1006 and, based on the information stored in the printer information storage unit 1002, identifies a proxy ID. The print notification transmission unit 1013 transmits to an interface having the identified proxy ID the notification information A for notifying that print data for the SPID managed by the proxy has been prepared.

Since the notification information A conforms to an original communication method of the printing service, it is necessary to implement an interface capable of interpreting the original communication method to perform communication Implementing such an interface in a printer enables directly registering the printer to the print server. Further, implementing the interface in an apparatus capable of communication such as the server and client enables registering the apparatus as a proxy. In the present exemplary embodiment, the communication module Ay 910 implements an interface capable of interpreting the original communication method, enabling communication with the communication module Ax 1010.

A mechanism with which the communication module Ax and the communication module Ay 910 can communicate with each other is referred to as a specification of a vendor providing the print server group 130. This specification deeply depends on a vendor managing the print server group 130. The vendor managing the print server group 130 implements the communication module Ax in the print server group 130, and discloses the specification of the communication module Ay 910 for communicating with the communication module Ax. The specification of data communication disclosed by the vendor managing the print server group 130 is equivalent to a first specification. Interfaces of the communication modules Ax and Ay are generated based on the first specification. The communication module Ay 910 is equivalent to a first communication unit.

There has been a problem that a printer not having a communication module conforming to a vendor specification cannot be connected to a printing service. Further, there has been another problem that, even if a printer includes a communication module applicable to a certain printing service, the printer cannot be connected to a printing service having another communication specification. However, the use of printing functions of the print relay server 120 (described below) enables resolving the above-described problems.

Printing functions of the print relay server 120 will be described below. Printing functions of the printing service proxy 325 will be described below. The printing service proxy 325 receives a print notification and an SPID from the printing service 330 and then identifies a VPID corresponding to the SPID. The printing service proxy 325 further receives print data from the printing service 330 and then transmits it to the relay virtual printer 323 corresponding to the identified VPID to accomplish printing.

Functions of the printing service proxy 325 will be described below with reference to FIG. 9.

The printing service proxy 325 includes the communication module Ay 910. The print notification receiving unit 913 of the communication module Ay 910 receives the notification information A transmitted from the print notification transmission unit 1013. Since the relay virtual printer 323 is registered in the printing service 330 via the printing service proxy 325, the notification information A is transmitted to the communication module Ay 910 of the printing service proxy 325. Since the communication module Ay 910 is a paired module of the communication module Ax, the print notification receiving unit 913 can interpret the notification information A.

The print notification receiving unit 913 instructs the control unit 915 to determine a target printer. The control unit 915 acquires an SPID 1361 of a service printer from the printing notification information A. This SPID is apparatus information about an image forming apparatus specified at the time of printing designation and registered in the print server system, i.e., an SPID received by the print instruction receiving unit 1004 according to an instruction from the user. Then, the control unit 915 requests the printer information request transmission unit 916 for a VPID value corresponding to the SPID. The printer information request transmission unit 916 requests the cooperative processing management service 324 for printer information corresponding to the SPID. Upon reception of the request, the printer information request receiving unit 820 of the cooperative processing management service 324 acquires from the printer information storage unit 804 information associated with the specified SPID and then returns the information to the printer information request receiving unit 820. The printer information request receiving unit 820 returns the same information to the printer information request transmission unit 916. The printer information request transmission unit 916 acquires a VPID value from the acquired information and then transmits it to the control unit 915. Then, the control unit 915 transmits the acquired VPID to the print notification transmission unit 923. The print notification transmission unit 923 identifies a destination relay virtual printer 323 based on the acquired VPID.

The print notification receiving unit 913 confirms the print data storage location and the print setting storage location described in the notification information A and then notifies the print data acquisition unit 911 and the print setting acquisition unit 912 of the print data storage location and the print setting storage location, respectively. Based on the notified print data storage location, the print data acquisition unit 911 acquires the print data from the print data storage unit 1011 and then instructs the print data storage unit 921 to store the print data. The print data storage unit 921 stores the print data and then notifies the print notification transmission unit 923 of the print data storage location. Based on the notified print setting storage location, the print setting acquisition unit 912 acquires print settings from the print setting storage unit 1012 and then instructs the print setting storage unit 922 to store the print settings. The print setting storage unit 922 stores the print settings and then notifies the print notification transmission unit 923 of the print setting storage location.

Upon reception of respective storage location notifications from the print data storage unit 921 and the print setting storage unit 922, the print notification transmission unit 923 generates notification information B. The notification information B can be represented in the XML format, as illustrated in FIG. 13G. The notification information B includes a print data storage location 1371 and a print setting storage location 1372. The print notification transmission unit 923 transmits the notification information B to the print notification receiving unit 603 of the relay virtual printer 323 identified by the control unit 915. The notification information B is equivalent to the second specification and is used for communication between the printing service proxy 325 and the relay virtual printer 323. The printing service proxy 325 and the relay virtual printer 323 exist in the relay virtual server 120, and communication in any combination is possible. The second specification is the internal format of the relay virtual server 120. The implementation of the printing service proxy 325 and a data format handled thereby largely depend on the printing service 330. Therefore, a high versatility format is used. The print notification transmission unit 923 and the print notification receiving unit 603 are equivalent to a second communication unit. Thus, the printing service proxy 325 transfers a print job to an identified relay virtual printer 323. When transferring the print job, the printing service proxy 325 may transfer print data and print settings at the same timing or at independent different timings.

There has been a problem that, when a printer having a communication module is directly registered to the printing service, push printing cannot be performed from a user logging in with a user account other than the one for printer connection. Further, when reconnection is made by the printer side by periodically changing the user account, it takes time until a specific user can start printing. However, as described in main registration functions of the printing service proxy 325, the printing service proxy 325 is independently connected to the printing service 330 for each of a plurality of print server systems connected to the print relay server 120 and for each user ID. Therefore, as soon as the specific printing service 330 has prepared for printing for a certain user, the printing service proxy 325 can receive relevant print data. Further, push printing is enabled for each printer by printing functions of the relay virtual printer 323 (described below). The printing service proxy 325 and the relay virtual printer 323 are independent of each other. Specifically, the printing service 330 and its printing service proxy 325 establish one session for each user. The image forming apparatus and the relay virtual printer 323 establish one session for each image forming apparatus. A relay virtual printer 323 is identified from the apparatus information, and a print job is transferred from the printing service proxy 325 to the relay virtual printer 323. This configuration enables performing push printing at high speeds without performing unnecessary communication. Thus, the above-described problems are solved. Further, since a print job is acquired from a printing service 330 for each user of the print relay server system, print job management can be performed on a user basis. For example, the number of print jobs received from the printing service 330 can be managed on a user basis. The use of the printing service 330 can be limited depending on the number of uses of the printing service 330.

Figure 20A:
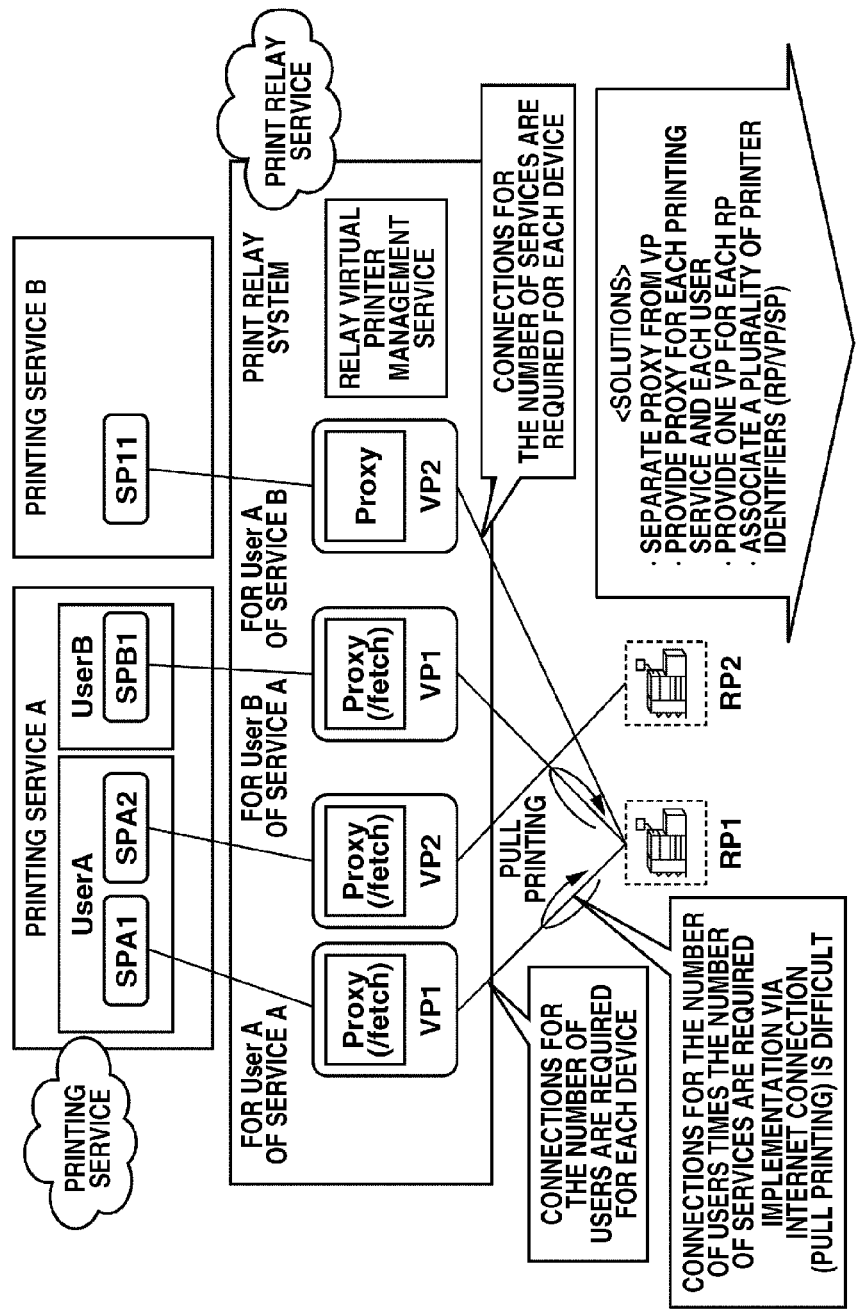
FIG. 20A illustrates a configuration in which a proxy and a relay virtual printer are not independent of each other.
Figure 20B:
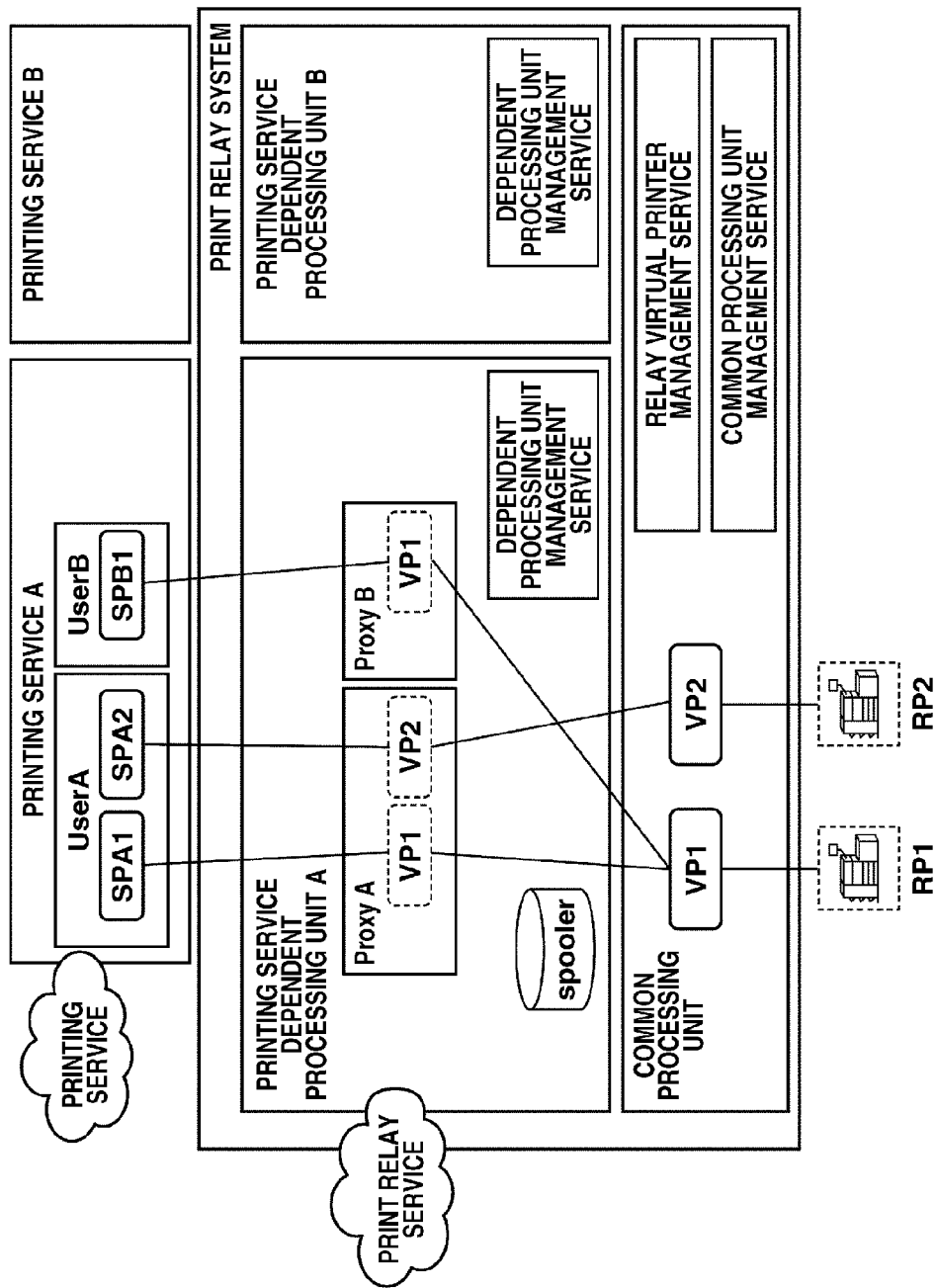
FIG. 20B illustrates a configuration in which the proxy and the relay virtual printer are independent of each other.

Advantages of a configuration in which the printing service proxy 325 and the relay virtual printer 323 are independent of each other will be described in more detail below. FIG. 20A illustrates a configuration in which the printing service proxy 325 and the relay virtual printer 323 are not independent of each other. A printer registered in the printing service 330 needs to be associated with a relay virtual printer 323. Preparing a relay virtual printer 323 on a printing service basis and on a user basis enables print job management on a user basis. In this case, however, each image forming apparatus accesses a plurality of relay virtual printers 323 to confirm a print job for each user. This configuration causes not only communication traffic to the print relay server but also a delayed output of the print job. On the other hand, the configuration according to the present exemplary embodiment (see FIG. 20B) enables print processing having the above-described effects.

Printing functions of the relay virtual printer 323 of the print relay server 120 will be described below. The relay virtual printer 323 receives print data from the printing service proxy 325, generates a print job based on print settings received together with the print data, and then transmits the generated print job to the printer 110 to accomplish printing.

Figure 6:
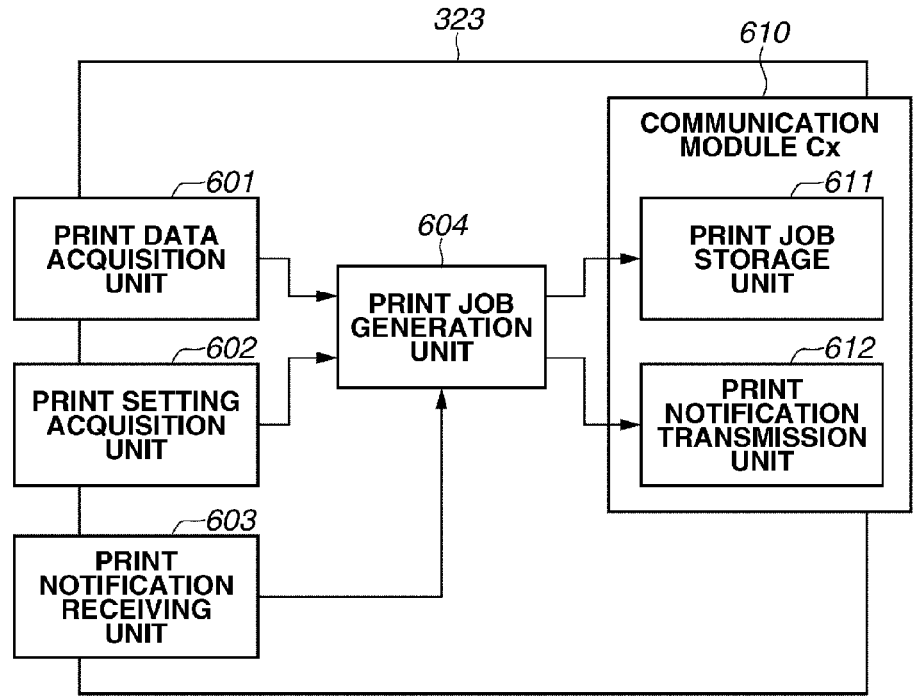
FIG. 6 is a block diagram illustrating a relay virtual printer.

Functions of the relay virtual printer 323 will be described below with reference to FIG. 6.

The print notification receiving unit 603 receives the notification information B from the print notification transmission unit 923. The print notification receiving unit 603 confirms the print data storage location and the print setting storage location described in the notification information B and then notifies the print data acquisition unit 601 and the print setting acquisition unit 602 of the print data storage location and the print setting storage location, respectively.

Based on the notified print data storage location, the print data acquisition unit 601 acquires the print data from the print data storage unit 921. Based on the notified print setting storage location, the print setting acquisition unit 602 acquires the print settings from the print setting storage unit 922.

The print job generation unit 604 receives the print data from the print data acquisition unit 601 and the print settings from the print setting acquisition unit 602 and then generates a print job according to the capabilities and print settings of the printer. The capabilities of a printer include a print data format that can be interpreted by the printer and information about whether the printer itself can download data from a specified location. These pieces of information are described in the capabilities 1204 in the printer information managed by the relay virtual printer 322. Therefore, if the printer 110 can interpret the print data received by the print data acquisition unit 601, a print job may be generated without converting the print data. A print job including the print data and print settings acquired from the printing service 330 may be acquired at one time. Further, the print job generation unit 604 may generate a new print job based on the acquired print data and print settings, i.e., a print job. A new print job may include, for example, image data with an attached copy-forgery-inhibited pattern image and form printing image data.

The print job generation unit 604 stores the generated print job in the print job storage unit 611 and then notifies the print notification transmission unit 612 of the storage location. The print notification transmission unit 612 generates notification information C including the storage location and then transmits the notification information C to the printer 110. The communication module Cy 410 corresponding to the communication module Cx 610 is implemented in the printer 110.

As described above, the printer 110 acquires print data from the print server group 130 via the print relay server 120. A device vendor does not need to change the communication module of the printer 110 even if the printer 110 does not include a communication module conforming to a printing service vendor, if the communication method of the printing service vendor is modified, or if the printer 110 is applied to a new printing service vendor. By changing the printing service proxy 325 of the print relay system, the device vendor can achieve communication between the printer 110 and the print server group 130 arranged in various user environments. A possible method for changing the printing service proxy 325 is to change the communication module Ay 910 of the printing service proxy 325. Another possible method therefor is to cancel the existing printing service proxy 325 and then to generate a new printing service proxy 325.

There has also been a problem that, if a printer cannot interpret the format of the print data generated by the printing service 330, the printer cannot print the print data. However, this problem is resolved since, as described above, the relay virtual printer 323 converts the print data into a format that can be interpreted by the printer 110.

Printing functions of the printer 110 will be described below.

The printing control unit 310 of the printer 110 receives print data from the relay virtual printer 323 and then performs printing.

Functions of the printing control unit 310 will be described below with reference to FIG. 4.

The printing control unit 310 includes the communication module Cy 410. The print notification receiving unit 412 of the communication module Cy 410 receives the notification information C from the print notification transmission unit 612. Since the communication module Cy is a paired module of the communication module Cx, it can interpret the notification information C. A specification prescribed by a device vendor to perform data communication between the relay virtual printer 323 and the printer 110 is equivalent to a third specification. The third specification can be handled by the device vendor. Interfaces of the communication modules Cx and Cy are generated based on the third specification. The print notification transmission unit 612 is equivalent to a third communication unit.

The print notification receiving unit 412 confirms the print job storage location described in the notification information C and then notifies the print job acquisition unit 411 of the print job storage location. Based on the notified print job storage location, the print job acquisition unit 411 acquires the print job from the print job storage unit 611. The print notification receiving unit 412 transmits to the print execution unit 413 the print job acquired by the print job acquisition unit 411 to instruct the print execution unit 413 to execute relevant printing. Upon reception of the print execution instruction, the print execution unit 413 instructs the printing unit to output the received print job.

This completes descriptions of the printing functions for printing print data (generated by the print server group 130) on the printer 110 via the print relay server 120.

Pre-registration processing, main registration processing, and printing processing will be described below with reference to sequence diagrams in FIGS. 16, 17, 18A, 18B, and 18C, respectively.

Figure 16:
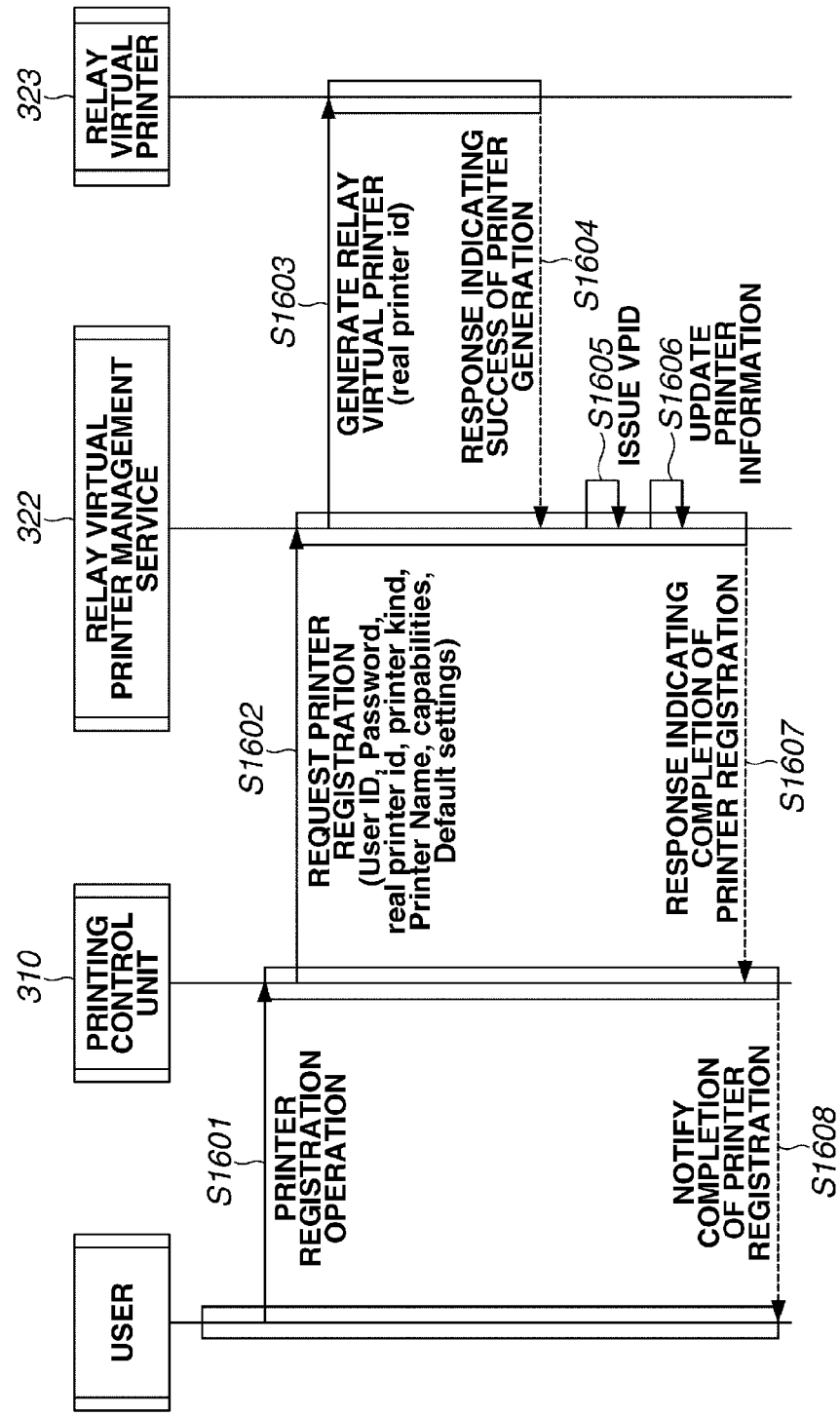
FIG. 16 is a sequence diagram illustrating pre-registration processing for registering a printer to a print relay server.

As the first category, processing for registering a printer 110 to the print relay server 120 and implementing a relay virtual printer 323 in the print relay server 120 will be described below with reference to FIG. 16.

In step S1601, the user performs an operation for registering the printer 110 to the relay virtual printer management service 322 from a UI of the printer 110. In step S1602, the printing control unit 310 of the printer 110 requests the relay virtual printer management service 322 to register the printer 110. In step S1603, the relay virtual printer management service 322 implements the relay virtual printer 323 based on registration information. In step S1604, the relay virtual printer 323 transmits to the relay virtual printer management service 322 a response indicating the success of generation of the relay virtual printer 323. In step S1605, the relay virtual printer management service 322 issues a VPID for identifying the generated relay virtual printer 323. In step S1606, the relay virtual printer management service 322 stores the VPID and associated information as printer information. The printer information is equivalent to the table illustrated in FIG. 12A. The VPID is managed in association with the RPID, printer name, capabilities, etc. In step S1607, the relay virtual printer management service 322 notifies the printing control unit 310 of the completion of printer registration. In step S1608, the printing control unit 310 instructs the UI of the printer 110 to display the completion of printer registration.

This completes descriptions of the pre-registration processing as the first category.

As the second category, processing for registering a relay virtual printer 323 (managed by the print relay server 120) to a printing service 330 via the printing service proxy 325 will be described below with reference to FIG. 17.

In step S1701, the user logs into the relay virtual server 120 via the web browser 340. In step S1702, the main processing management service 321 of the relay virtual server 120 accepts a user operation via a generated UI and then receives a request to cooperate with the printing service 330, i.e., a request to register the printer to the printing service 330. In step S1703, the main processing management service 321 transmits to the cooperative processing management service 324 the request to register the printer to the printing service 330 and the printer information.

In step S1704, the cooperative processing management service 324 performs user authentication for the printing service 330. Specifically, the user inputs on a login screen displayed by the printing service 330 a user account (a user ID and a password) for accessing the printing service 330. In step S1705, when user authentication is successfully completed, the printing service 330 returns to the cooperative processing management service 324 a response indicating the success of user authentication and an authentication token. The cooperative processing management service 324 receives the returned authentication token. Subsequently, the authentication token can be used to communicate with the printing service 330. In the present exemplary embodiment, the authentication token is used when the printing service proxy 325 communicates with the printing service 330. Since the authentication token (not illustrated) needs only to be transferred to the printing service proxy 325, it may be managed in the table illustrated in FIG. 12C. In step S1706, the cooperative processing management service 324 implements the printing service proxy 325 for the present user account. In step S1707, the printing service proxy 325 transmits to the cooperative processing management service 324 a response indicating the success of generation of the printing service proxy 325. In step S1708, the cooperative processing management service 324 issues a proxy ID for identifying the generated printing service proxy 325. In step S1709, the cooperative processing management service 324 transmits to the printing service proxy 325 the authentication token to the printing service 330, a request to register the printer to the printing service 330, and printer information. In step S1710, the printing service proxy 325 connects with the printing service 330 by using the above-described authentication token and then transmits to the printing service 330 a request to register the printer and printer information. In step S1711, the printing service 330 registers the requested printer as a service printer and then issues to the service printer an SPID for individual identification. In this case, the printing service 330 generates the table illustrated in FIG. 12E. In step S1712, the printing service 330 returns to the printing service proxy 325 a response indicating the success of service printer generation, and the SPID. In step S1713, the printing service proxy 325 returns to the cooperative processing management service 324 a response indicating the success of service printer generation, and the SPID. In step S1714, the cooperative processing management service 324 stores as user information the user ID and information such as the proxy ID associated with the user ID. The user information is equivalent to the table illustrated in FIG. 12C. In step S1715, the cooperative processing management service 324 stores as printer information the SPID and information such as the VPID associated with the SPID. The printer information is equivalent to the table illustrated in FIG. 12D. In step S1716, the cooperative processing management service 324 notifies the main processing management service 321 of the completion of printer registration. In step S1717, the main processing management service 321 displays the completion of printer registration on the web browser 340.

This completes descriptions of the main registration processing as the second category.

As described above, the main registration processing enables generating a printing service proxy 325 on a user account basis and on a printing service basis, and registering via the printing service proxy 325 printers usable by the user.

Figure 18A:
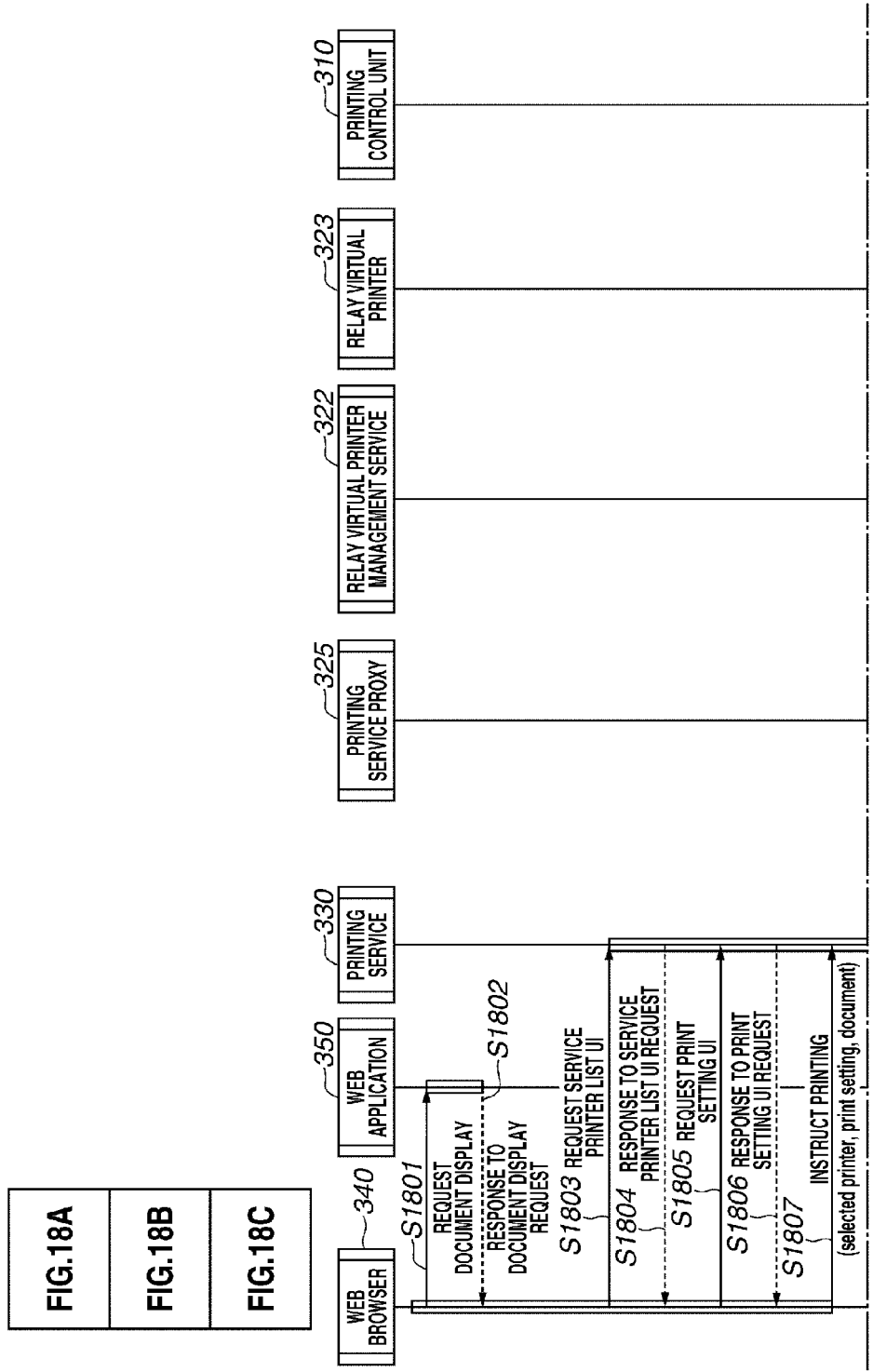
FIG. 18A is a sequence diagram illustrating, in conjunction with FIGS. 18B and 18C, print processing for printing, on a printer, print data transmitted from a print server group.
Figure 18B:
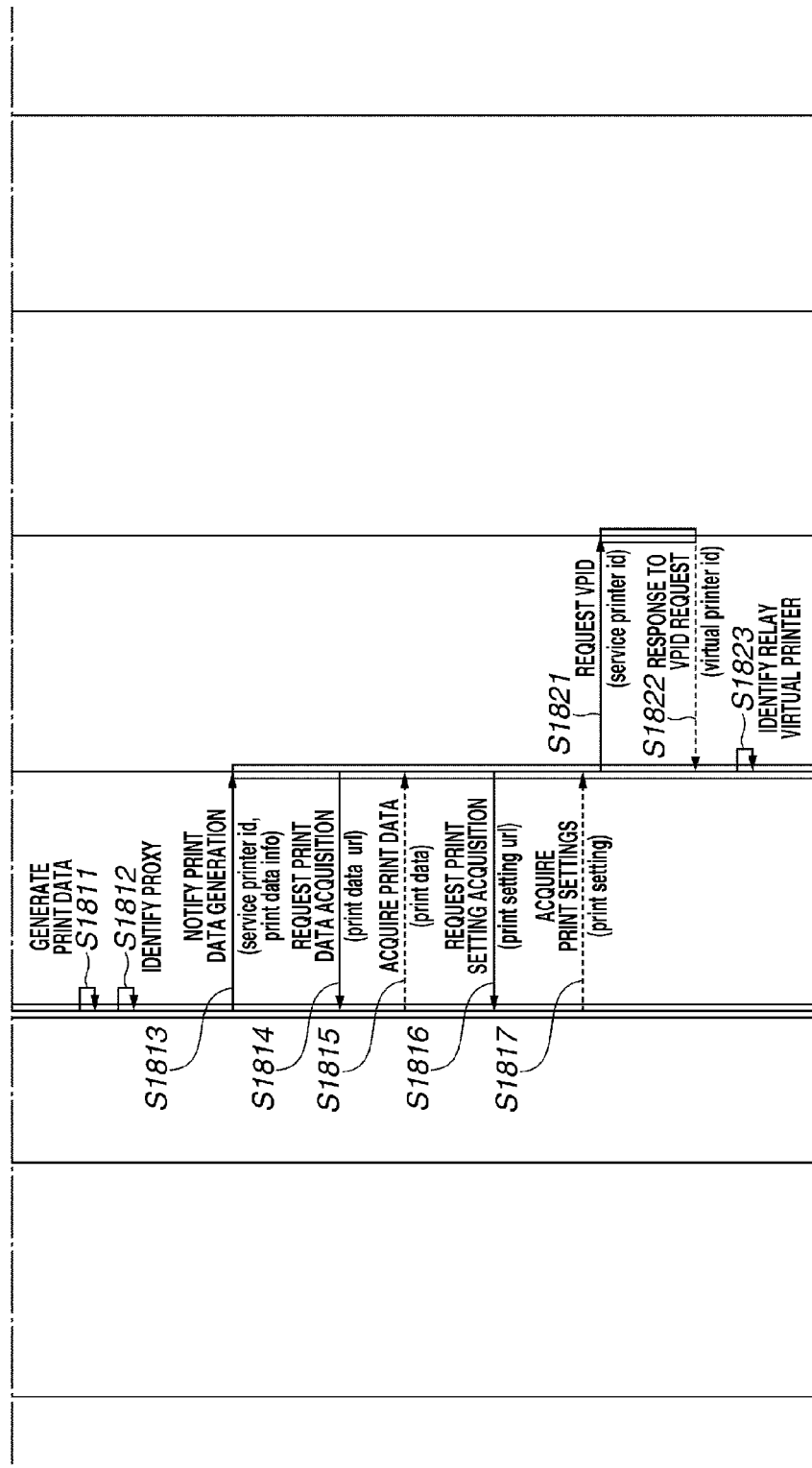
FIG. 18B is a sequence diagram illustrating, in conjunction with FIGS. 18A and 18C, print processing for printing, on the printer, print data transmitted from the print server group.
Figure 18C:
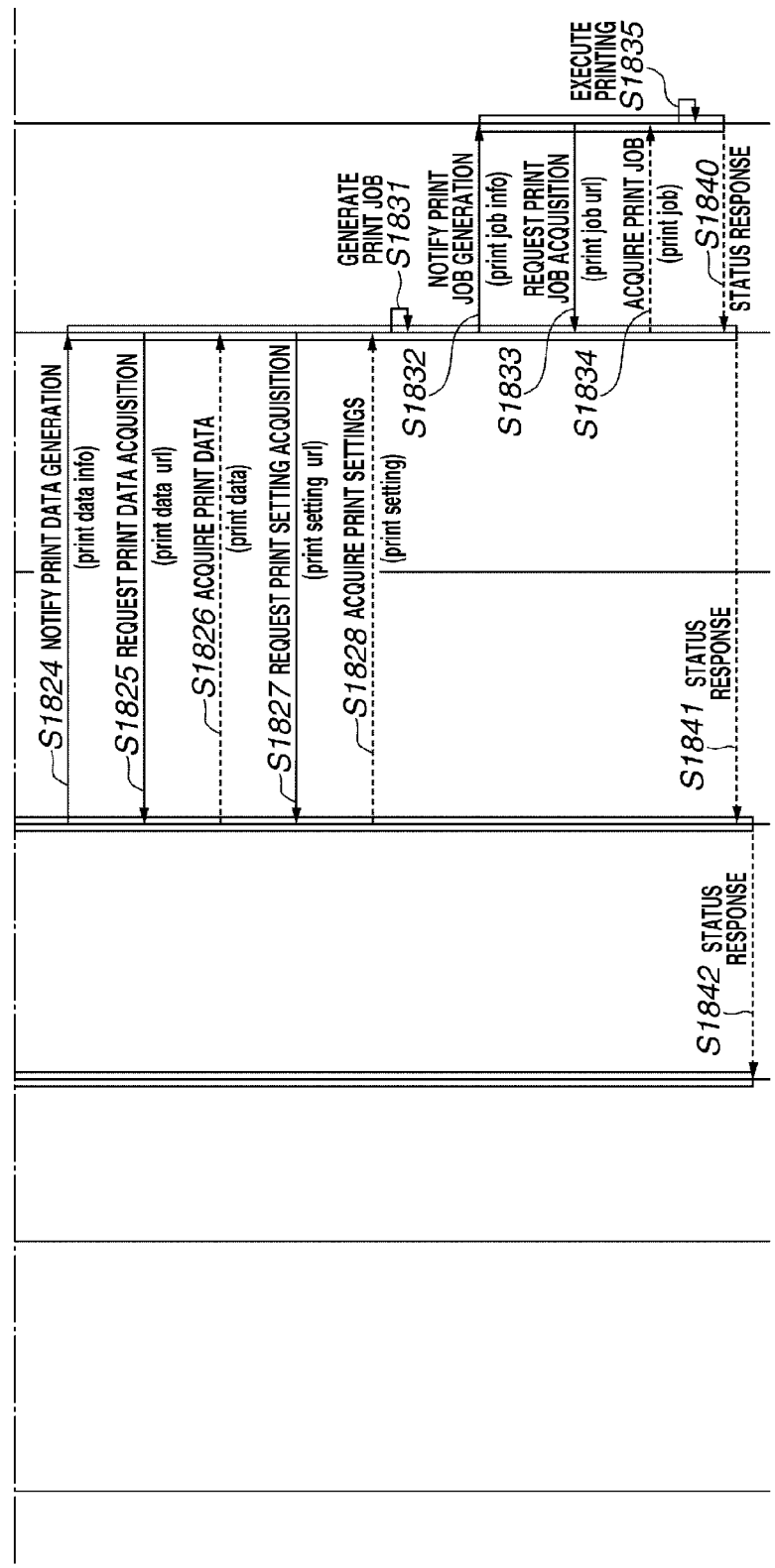
FIG. 18C is a sequence diagram illustrating, in conjunction with FIGS. 18A and 18B, print processing for printing, on the printer, print data transmitted from the print server group.

Finally, as the third category, processing for printing print data (generated by the print server group 130) on the printer 110 via the print relay server 120 will be described below with reference to FIGS. 18A, 18B, and 18C.

In step S1801, the web browser 340 requests the web application 350 to display content to be edited by the user. In step S1802, the web application 350 transmits to the web browser 340 a content screen corresponding to the requested content. In step S1803, in response to a user request to print the content via the content screen, the web browser 340 requests the printing service 330 for a screen displaying a printer list of service printers registered in the printing service 330. In step S1804, the printing service 330 transmits to the web browser 340 the screen displaying a printer list of registered service printers (hereinafter this screen is referred to as service printer list screen). The service printer list screen can be generated by referring to the table illustrated in FIG. 12E and a printer name list associated with the user ID. In step S1805, in response to the user selecting a service printer from the service printer list screen, the web browser 340 requests the printing service 330 for a print setting screen corresponding to the selected service printer. In step S1806, the printing service 330 transmits the requested print setting screen to the web browser 340. In step S1807, the web browser 340 transmits to the printing service 330 print settings input via the print setting screen by the user.

In step S1811, the printing service 330 acquires from the web application 350 identification information of print data specified to be printed by the user. The printing service 330 acquires or generates print data and then provides a state in which the print data can be downloaded. In step S1812, referring to the table illustrated in FIG. 12E, the printing service 330 identifies an SPID and a printing service proxy 325 associated with a specified printer name. Specifically, the printing service 330 identifies a relay virtual printer 323 coinciding with the acquired apparatus information out of apparatus information stored in the table illustrated in FIG. 12E. In step S1813, the printing service 330 notifies the identified printing service proxy 325 that print data for the service printer specified by the SPID has been generated. In step S1814, the printing service proxy 325 requests the printing service 330 to acquire the print data. In step S1815, the printing service proxy 325 acquires the print data from the printing service 330. In step S1816, the printing service proxy 325 requests the printing service 330 to acquire print settings. In step S1817, the printing service proxy 325 acquires the print settings from the printing service 330.

In step S1821, the printing service proxy 325 inquires of the relay virtual printer management service 322 a VPID value corresponding to the SPID. In step S1822, referring to the table illustrated in FIG. 12D, the relay virtual printer management service 322 acquires a VPID corresponding to the specified SPID and then returns the VPID value to the printing service proxy 325. In step S1823, the printing service proxy 325 identifies a process of the relay virtual printer 323 identified by the acquired VPID. In step S1824, the printing service proxy 325 notifies the relay virtual printer 323 that the print data has been generated. In step S1825, the relay virtual printer 323 requests the printing service proxy 325 to acquire the print data. In step S1826, the relay virtual printer 323 acquires the print data from the printing service proxy 325. In step S1827, the relay virtual printer 323 requests the printing service proxy 325 to acquire the print settings. In step S1828, the relay virtual printer 323 acquires the print settings from the printing service proxy 325.

In step S1831, based on the acquired print settings, the relay virtual printer 323 generates a print job (page description language (PDL) data and a raster image) based on the acquired print data. In step S1832, the relay virtual printer 323 notifies the printing control unit 310 of the corresponding printer 110 that a print job has been generated. The corresponding printer 110, i.e., an actual printer identifiable by an RPID associated with the relay virtual printer 323 identifiable by the VPID, can be acquired from the table illustrated in FIG. 12A. In the present exemplary embodiment, when implementing the relay virtual printer 323, it is also possible to establish a connecting relation with the corresponding printer 110. In step S1833, the printing control unit 310 requests the relay virtual printer 323 to acquire the print job. In step S1834, the printing control unit 310 acquires the print job from the relay virtual printer 323. In step S1835, the printing control unit 310 instructs the printing unit to print the acquired print job.

In step S1840, the printing control unit 310 transmits a printing result status to the relay virtual printer 323. In step S1841, the relay virtual printer 323 transmits the printing result status to the printing service proxy 325. In step S1842, the printing service proxy 325 transmits the printing result status to the printing service 330.

This completes descriptions of the printing processing as the third category.

As described above, a print instruction performed via the browser 340 is notified to a printing service proxy 325 having a specified SPID. Then, the printing service proxy 325 identifies a VPID corresponding to the SPID, identifies an RPID corresponding to the VPID, and then performs printing on a printer corresponding to the RPID. Since the printing service proxy 325 exists for each printing service 330 and for each user ID, push printing is constantly enabled at the time of printing from any printing service of any user.

Procedures for adding and deleting a printer will be described below.

A case where printer addition or deletion is requested in step S1703 (see FIG. 17) will be described below. Since the user has already logged into the printing service 330, steps S1704 and S1705 are skipped. Further, since the printing service proxy 325 has already been generated, steps S1706 to S1708 are skipped.

In step S1709, the relay virtual printer 323 transmits to the printing service proxy 325 a printer addition or deletion request and information about a target printer.

In step S1710, the printing service proxy 325 transmits to the printing service 330 the printer addition or deletion request and the information about the target printer. In step S1711, in response to the printer addition or deletion request, the printing service 330 adds or deletes the target printer.

Although, in the present exemplary embodiment, information transmitted within the content printing system 1000 is represented in the XML format as illustrated in FIG. 13, the format is not limited thereto and may be other formats. Information may be represented, for example, in the JSON format, as illustrated in FIG. 14.

Although, in first exemplary embodiment, all printers usable by the user on the relay virtual server 120 are registered to the printing service 330, printers to be registered may be selected by the user.

FIG. 19A illustrates an example UI displayed on the cooperative processing management service 324 according to a second exemplary embodiment. This UI enables the user to select printers to be added or deleted. A printer list 1901 displays printers registered in the printing service 330. The user can select one or more printers to be deleted from the printing service 330. A printer list 1902 displays printers not registered in the printing service 330 and usable in a print relay service 120 by the relevant user. The user can select one or more printers to be added (registered) to the printing service 330.

Figure 17:
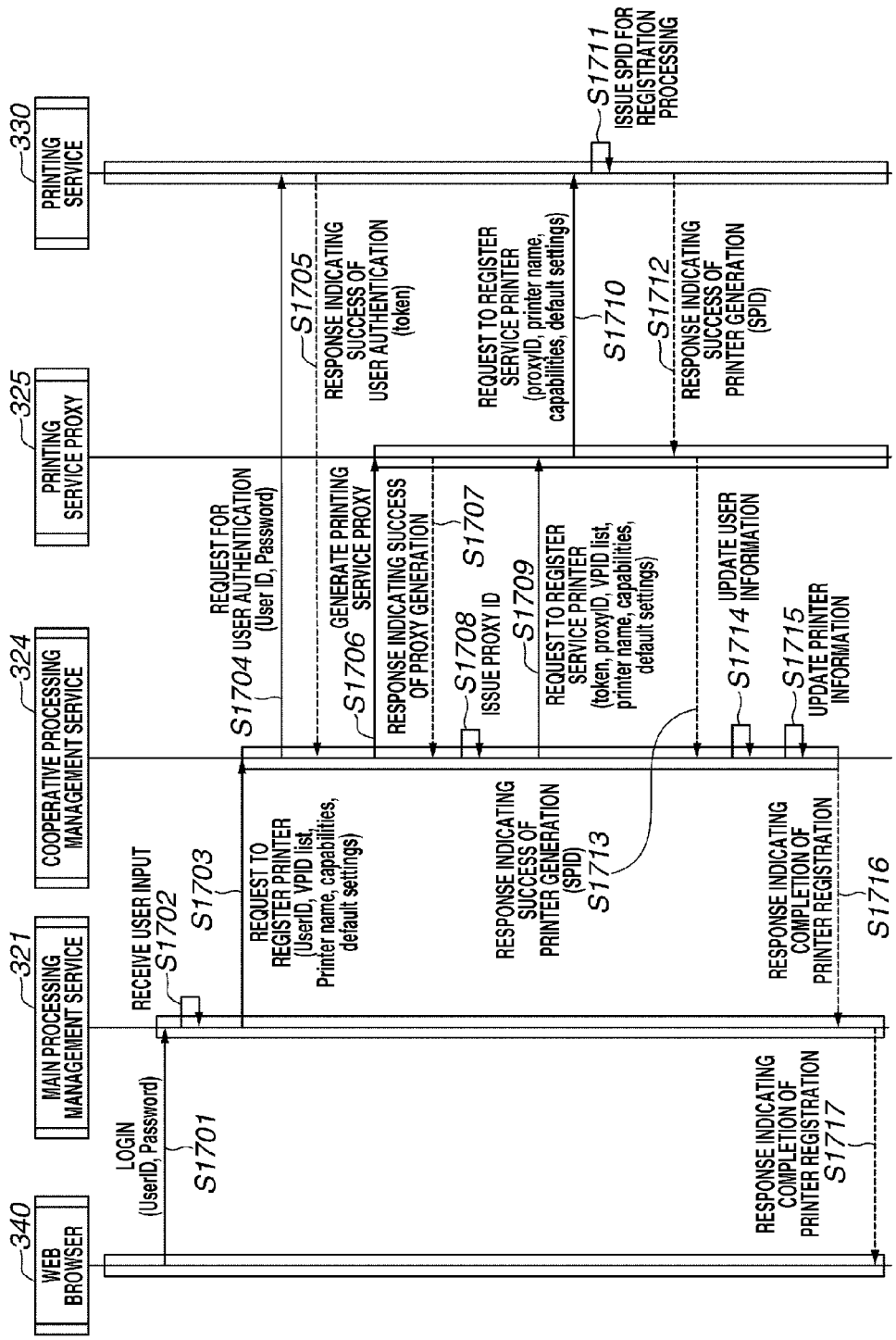
FIG. 17 is a sequence diagram illustrating main registration processing for registering the relay virtual printer to the printing service.

The printer addition or deletion request is notified to the printing service proxy 325 in step S1709 in FIG. 17 and then reflected to the printing service 330 in step S1710.

The above processing enables the user to select printers to be registered to each printing service from printers usable in the relay virtual server 120.

Although, in first exemplary embodiment, cooperative processing is implemented when the user determines a printing service to be associated and then presses the USE THIS PRINTING SERVICE button 1115 in the screen illustrated in FIG. 11B, the processing is not limited thereto. Printers may be collectively registered to a plurality of printing services.

FIG. 19B illustrates an example UI displayed on the relay virtual printer management service 322 according to a third exemplary embodiment. This UI enables the user to collectively register printers to a plurality of printing services. A printing service list 1911 displays printing services that can be associated. Pressing the REGISTER TO PRINTING SERVICE button 1912 enables the user to collectively register usable printers to the printing services selected in the printing service list 1911.

The user may perform this procedure when selecting printers usable on the print relay server 120. FIG. 19C illustrates an example UI for adding printers, displayed instead of the screen illustrated in FIG. 11D. This UI includes a printing service list 1921, a printer list 1922 from which the user can select printers, and a new printer registration function 1923. Printers selected in this UI become usable by the user and also are registered to the printing services selected in the printing service list 1921.

In step S1702 in FIG. 17, the main processing management service 321 accepts an operation for collective printer registration. In step S1703, the main processing management service 321 sequentially issues a registration request to each of the cooperative processing management services 324 to achieve printer registration.

The above-described processing enables the user to collectively register printers to a plurality of cooperative processing management services 324 without performing the same registration procedure for each of target printing services.

In the third exemplary embodiment, when the user selects a plurality of printing services, registration processing is sequentially performed for each of the printing services 330. However, since the use of each printing service may require user authentication, it is troublesome for the user that the login request intermittently appears. In a fourth exemplary embodiment, when printers are collectively registered to a plurality of printing services, the order of processing is changed.

The fourth exemplary embodiment will be described below with reference to FIG. 17. When the main processing management service 321 requests a certain cooperative processing management service 324 in step S1703, the cooperative processing management service 324 performs user authentication in step S1704, holds an authentication token, and once returns control to the main processing management service 321. Likewise, the main processing management service 321 requests the next cooperative processing management service 324 and then performs only user authentication. After the main processing management service 321 performs the above-described processing for all cooperative processing management services 324, the main processing management service 321 requests again the cooperative processing management services 324 to register printers to respective printing services 330.

The above-described processing enables the user to collectively perform necessary processing first, thus reducing a wait time during operation.

In the third exemplary embodiment, the user can input the printer information 1923 for adding a new printer in the UI illustrated in FIG. 19C. However, when registering printers to the printing service 330, further information may be required depending on the printing service 330. Then, depending on the selected printing service 330, the required information can be input in advance.

With the printer information 1923 in the UI illustrated in FIG. 19C, an item 1 is required for a printing service A and not required for other printing services. In this case, when the printing service A is checked in the printing service list 1921, the item 1 can be input. Otherwise, when the printing service A is not checked, the item 1 cannot be input.

The above-described processing enables the user, at the time of printer registration, to input sufficient information required to register printers to the printing services 330.

Although, in the first exemplary embodiment, the relay virtual printer 323 and the printing service proxy 325 are different processes, they may be implemented as one process. In this case, a process is generated for each user ID and for each printing service. Thus, push printing is enabled for any user ID of any printing service.

Although, in first exemplary embodiment, the third specification was prescribed by a device vendor, a general-purpose specification independent of device vendors may be used. Using a general-purpose specification enables configuring a system connectable with any printer of any device vendor.

An aspect of the present invention can also be achieved by performing the following processing. Specifically, a storage medium storing program code of software for implementing the functions of the above-described exemplary embodiments is supplied to the system or apparatus, and the program code stored in the storage medium is loaded by a computer (or CPU, microprocessor unit (MPU), etc.) of the system or apparatus. In this case, the program code itself loaded from the storage medium implements the functions of the above-described exemplary embodiments. The program code and the storage medium storing it constitute the present invention. Executing the program code enables controlling an information processing apparatus according to the descriptions of the program code.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-144655 filed Jun. 29, 2011, which is hereby incorporated by reference herein in its entirety.

The invention claimed is:

1. A print relay server system capable of communicating with a print server system for generating a print job based on content data specified to be printed via a terminal and for transmitting the generated print job, and communicating with an image forming apparatus for outputting the print job, the print relay server system comprising:
   a proxy unit provided for each user registered in the print relay server system, wherein the proxy unit corresponding to a user receives the print job corresponding to the user from the print server system;
   a relay virtual printer provided for each image forming apparatus connected to the print relay server system and configured to receive the print job from the proxy unit corresponding to the user, and transmit the received print job to the associated image forming apparatus; and
   a storage unit configured to store apparatus information, which is transmitted for registration when the relay virtual printer is registered to the print server system, in such a way that the apparatus information is associated with the registered relay virtual printer,
   wherein the proxy unit acquires the apparatus information about an image forming apparatus specified for printing the content data and registered in the print server system,
   wherein the proxy unit specifies one relay virtual printer from among a plurality of registered relay virtual printers based on the apparatus information stored by the storage unit, coinciding with the acquired apparatus information, and
   wherein the proxy unit transfers the received print job to the specified relay virtual printer.

2. The print relay server system according to claim 1, wherein the proxy unit receives the print job based on a communication specification for receiving the print job disclosed by a vendor providing the print server system,
   wherein, when receiving the print job, the proxy unit acquires the apparatus information for the print job received by the proxy unit, and
   wherein one of a plurality of the proxies is registered to the print server system in association with a user who performs printing designation.

3. The print relay server system according to claim 1, wherein the print relay server system is also capable of communicating with another print server system different from the print server system, and
   wherein the proxy unit, provided for each user of the print relay server system, is provided for each of a plurality of print server systems connected to the print relay server system.

4. A control method for controlling a print relay server system capable of communicating with a print server system for generating a print job based on content data specified to be printed via a terminal and for transmitting the generated print job, and communicating with an image forming apparatus for outputting the print job, the control method comprising:
   receiving, by a proxy unit provided for each user registered in the print relay server system, the print job corresponding to the user from the print server system;
   receiving, via a relay virtual printer provided for each image forming apparatus connected to the print relay server system, the received print job from the proxy unit corresponding to the user, and transmitting, via the relay virtual printer, the received print job to the associated image forming apparatus;
   storing, in a storage unit, apparatus information, which is transmitted for registration when the relay virtual printer is registered to the print server system, in such a way that the apparatus information is associated with the registered relay virtual printer;
   acquiring, by the proxy unit, the apparatus information about an image forming apparatus specified for printing the content data and registered in the print server system;
   specifying, by the proxy unit, one relay virtual printer from among a plurality of relay virtual printers based on the apparatus information stored by the storage unit, coinciding with the acquired apparatus information; and
   transferring, by the proxy unit, the received print job to the specified relay virtual printer.

5. A non-transitory computer-readable storage medium storing computer-executable code of a program that, when executed by a computer processor, performs a control method for controlling a print relay server system capable of communicating with a print server system for generating a print job based on content data specified to be printed via a terminal and for transmitting the generated print job, and communicating with an image forming apparatus for outputting the print job, the control method comprising:
   receiving, via a proxy unit provided for each user registered in the print relay server system, the print job corresponding to the user from the print server system;
   receiving, via a relay virtual printer provided for each image forming apparatus connected to the print relay server system, the received print job from the proxy unit corresponding to the user, and transmitting, via the relay virtual printer, the received print job to the associated image forming apparatus;
   storing, in a storage unit, apparatus information, which is transmitted for registration when the relay virtual printer is registered to the print server system, in such a way that the apparatus information is associated with the registered relay virtual printer;

acquiring, by the proxy unit, the apparatus information about an image forming apparatus specified for printing the content data and registered in the print server system; and specifying, by the proxy unit, one relay virtual printer from among a plurality of relay virtual printers based on the apparatus information stored by the storage unit, coinciding with the acquired apparatus information; and transferring, by the proxy unit, the received print job to the specified relay virtual printer.

* * * * *